United States Patent
Pavao

(10) Patent No.: US 7,216,994 B2
(45) Date of Patent: *May 15, 2007

(54) VEHICLE EXTERIOR REARVIEW MIRROR ASSEMBLY

(75) Inventor: Leo W. Pavao, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/115,700

(22) Filed: Apr. 27, 2005

(65) Prior Publication Data

US 2005/0200987 A1   Sep. 15, 2005

Related U.S. Application Data

(62) Division of application No. 10/183,919, filed on Jun. 27, 2002, now Pat. No. 6,916,100.

(60) Provisional application No. 60/301,219, filed on Jun. 27, 2001.

(51) Int. Cl.
*G02B 7/182* (2006.01)
*B60R 1/06* (2006.01)
*B60Q 1/26* (2006.01)

(52) U.S. Cl. ............... 359/841; 359/843; 359/877; 362/494

(58) Field of Classification Search ......... 359/841, 359/843, 872, 877, 881; 362/494
See application file for complete search history.

(56) References Cited

U.S. PATENT DOCUMENTS

| | | | | |
|---|---|---|---|---|
| 2,595,331 A | * | 5/1952 | Calihan et al. | 362/494 |
| 2,871,761 A | * | 2/1959 | Suyder | 359/840 |
| 3,104,274 A | | 9/1963 | King | 88/87 |
| 3,375,053 A | | 3/1968 | Ward | 350/293 |
| 3,389,952 A | | 6/1968 | Tobin, Jr. | 350/303 |
| 4,268,120 A | | 5/1981 | Jitsumori | 350/302 |

(Continued)

FOREIGN PATENT DOCUMENTS

DE    3635 473 A1    4/1988

(Continued)

*Primary Examiner*—Ricky D. Shafer
(74) *Attorney, Agent, or Firm*—Van Dyke, Gardner, Linn & Burkhart, LLP

(57) ABSTRACT

A mirror system for a vehicle comprising an exterior rearview mirror assembly, which includes a fixed portion which is configured to mount to a side of the vehicle. The movable portion includes a reflective element and a reflective element actuator. The reflective element has a generally rearward field of view when the mirror system is mounted to the vehicle. The reflective element actuator provides selective adjustment of an orientation of the reflective element to adjust the rearward field of view to a desired orientation, and the movable portion is movably mounted to the fixed portion. The movable portion actuator selectively moves the movable portion between a viewing position wherein the movable portion extends outwardly from the vehicle at an angle with respect to the side of the vehicle and another viewing position wherein said movable portion extends outwardly from the vehicle at another angle with respect to the side of the vehicle. The movable portion actuator is adapted to move the movable portion to one of the positions, and the reflective element actuator is adapted to generally maintain the rearward field of view at the desired orientation independent of the position of the movable portion.

14 Claims, 11 Drawing Sheets

U.S. PATENT DOCUMENTS

| | | | |
|---|---|---|---|
| 4,281,899 A | 8/1981 | Oskam | 350/289 |
| 4,311,362 A | 1/1982 | LaPorte | 350/293 |
| 4,555,166 A | 11/1985 | Enomoto | 350/634 |
| 4,678,294 A | 7/1987 | Van Nostrand | 350/611 |
| 4,727,302 A | 2/1988 | Mizuta et al. | 318/567 |
| 4,770,522 A | 9/1988 | Alten | 350/633 |
| 4,809,137 A | 2/1989 | Yamada | 362/61 |
| 4,859,046 A | 8/1989 | Traynor et al. | 350/627 |
| 4,890,907 A | 1/1990 | Vu et al. | 350/605 |
| 4,917,485 A | 4/1990 | Baldwin, Sr. | 350/627 |
| 5,005,962 A | 4/1991 | Edelman | 350/625 |
| 5,017,903 A | 5/1991 | Krippelz, Sr. | 340/427 |
| 5,052,792 A | 10/1991 | McDonough | 359/843 |
| 5,059,015 A | 10/1991 | Tran | 359/844 |
| 5,115,352 A | 5/1992 | Go Espirito Santo | 359/855 |
| 5,210,651 A | 5/1993 | Shibuya et al. | 359/841 |
| 5,371,659 A | 12/1994 | Pastrick et al. | 362/83.1 |
| 5,432,643 A | 7/1995 | Huang | 359/864 |
| 5,497,305 A | 3/1996 | Pastrick et al. | 362/83.1 |
| 5,497,306 A | 3/1996 | Pastrick | 362/83.1 |
| 5,499,169 A | 3/1996 | Chen | 362/83.1 |
| 5,579,133 A | 11/1996 | Black et al. | 359/866 |
| 5,579,178 A | 11/1996 | Mochizuki | 359/841 |
| 5,621,569 A | 4/1997 | Schlenke | 359/603 |
| 5,624,176 A | 4/1997 | O'Farrell et al. | 362/83.1 |
| 5,669,699 A | 9/1997 | Pastrick et al. | 362/83.1 |
| 5,669,704 A | 9/1997 | Pastrick | 362/83.1 |
| 5,669,705 A | 9/1997 | Pastrick et al. | 362/83.1 |
| 5,774,283 A * | 6/1998 | Nagel et al. | 359/838 |
| 5,796,176 A | 8/1998 | Kramer et al. | 307/10.1 |
| 5,804,018 A | 9/1998 | Fisher et al. | 156/245 |
| 5,823,654 A | 10/1998 | Pastrick et al. | 362/83.1 |
| 5,863,116 A | 1/1999 | Pastrick et al. | 362/494 |
| 5,871,275 A | 2/1999 | O'Farrell et al. | 362/494 |
| 5,879,074 A | 3/1999 | Pastrick | 362/494 |
| 5,886,838 A * | 3/1999 | Kuramoto | 359/841 |
| 5,900,999 A | 5/1999 | Huizenga et al. | 359/877 |
| 5,903,402 A | 5/1999 | Hoek | 359/841 |
| 5,949,591 A | 9/1999 | Whitehead | 359/841 |
| 5,969,890 A | 10/1999 | Whitehead | 359/841 |
| 5,986,364 A | 11/1999 | Bingle et al. | 310/51 |
| 6,019,475 A | 2/2000 | Lynam et al. | 359/879 |
| 6,032,323 A | 3/2000 | Smith et al. | 15/250.003 |
| 6,037,689 A | 3/2000 | Bingle et al. | 310/89 |
| 6,074,077 A | 6/2000 | Pastrick et al. | 362/494 |
| 6,086,229 A | 7/2000 | Pastrick | 362/494 |
| 6,093,976 A | 7/2000 | Kramer et al. | 307/10.1 |
| 6,094,027 A | 7/2000 | Willmore et al. | 318/652 |
| 6,099,153 A | 8/2000 | Zimmermann et al. | 362/494 |
| 6,099,155 A | 8/2000 | Pastrick et al. | 362/494 |
| 6,109,586 A | 8/2000 | Hoek | 248/476 |
| 6,116,743 A | 9/2000 | Hoek | 359/871 |
| 6,124,886 A | 9/2000 | DeLine et al. | 348/148 |
| 6,132,052 A | 10/2000 | Huizenga et al. | 359/877 |
| 6,139,171 A | 10/2000 | Waldmann | 362/494 |
| 6,149,287 A | 11/2000 | Pastrick et al. | 362/494 |
| 6,163,083 A | 12/2000 | Kramer et al. | 307/10.1 |
| 6,168,279 B1 | 1/2001 | Schnell | 359/872 |
| 6,176,602 B1 | 1/2001 | Pastrick et al. | 362/494 |
| 6,183,096 B1 * | 2/2001 | Galicia | 359/871 |
| 6,193,380 B1 * | 2/2001 | Jacobs | 359/843 |
| 6,199,993 B1 | 3/2001 | Mou | 359/864 |
| 6,213,612 B1 | 4/2001 | Schnell et al. | 359/877 |
| 6,239,928 B1 * | 5/2001 | Whitehead et al. | 359/871 |
| 6,243,218 B1 | 6/2001 | Whitehead | 359/877 |
| 6,250,783 B1 | 6/2001 | Stidham et al. | 362/494 |
| 6,276,808 B1 * | 8/2001 | Foote et al. | 359/877 |
| 6,276,821 B1 | 8/2001 | Pastrick et al. | 362/494 |
| 6,280,068 B1 | 8/2001 | Mertens et al. | 362/494 |
| 6,315,437 B1 | 11/2001 | Katz et al. | 362/494 |
| 6,390,631 B1 * | 5/2002 | Lang et al. | 359/843 |
| 6,511,192 B1 | 1/2003 | Henion et al. | 359/864 |
| 6,522,451 B1 | 2/2003 | Lynam | 359/874 |
| 6,685,348 B2 | 2/2004 | Pastrick et al. | 362/494 |
| 6,848,816 B2 * | 2/2005 | Gilbert et al. | 362/494 |
| 6,916,100 B2 * | 7/2005 | Pavao | 359/841 |
| 7,073,914 B2 * | 7/2006 | Pavao | 359/841 |

FOREIGN PATENT DOCUMENTS

| | | |
|---|---|---|
| DE | 91 01 029.2 | 5/1991 |
| DE | 195 38 771 A1 | 10/1995 |
| DE | 297 02 746 U1 | 5/1997 |
| EP | 58188733 | 4/1983 |
| EP | 0 310 261 A1 | 5/1989 |
| EP | 0 820 900 A1 | 10/1996 |
| GB | 2 161 440 A | 7/1984 |
| WO | WO 89/01425 | 2/1989 |
| WO | WO 00/26700 * | 5/2000 |

\* cited by examiner

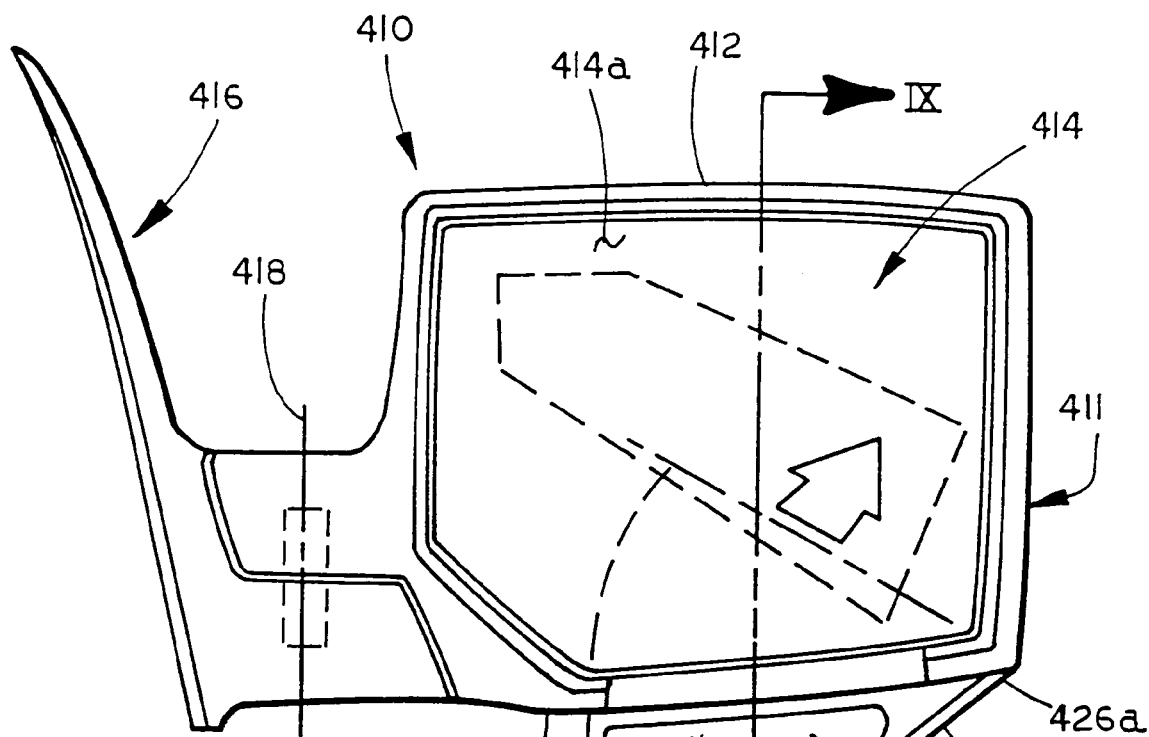
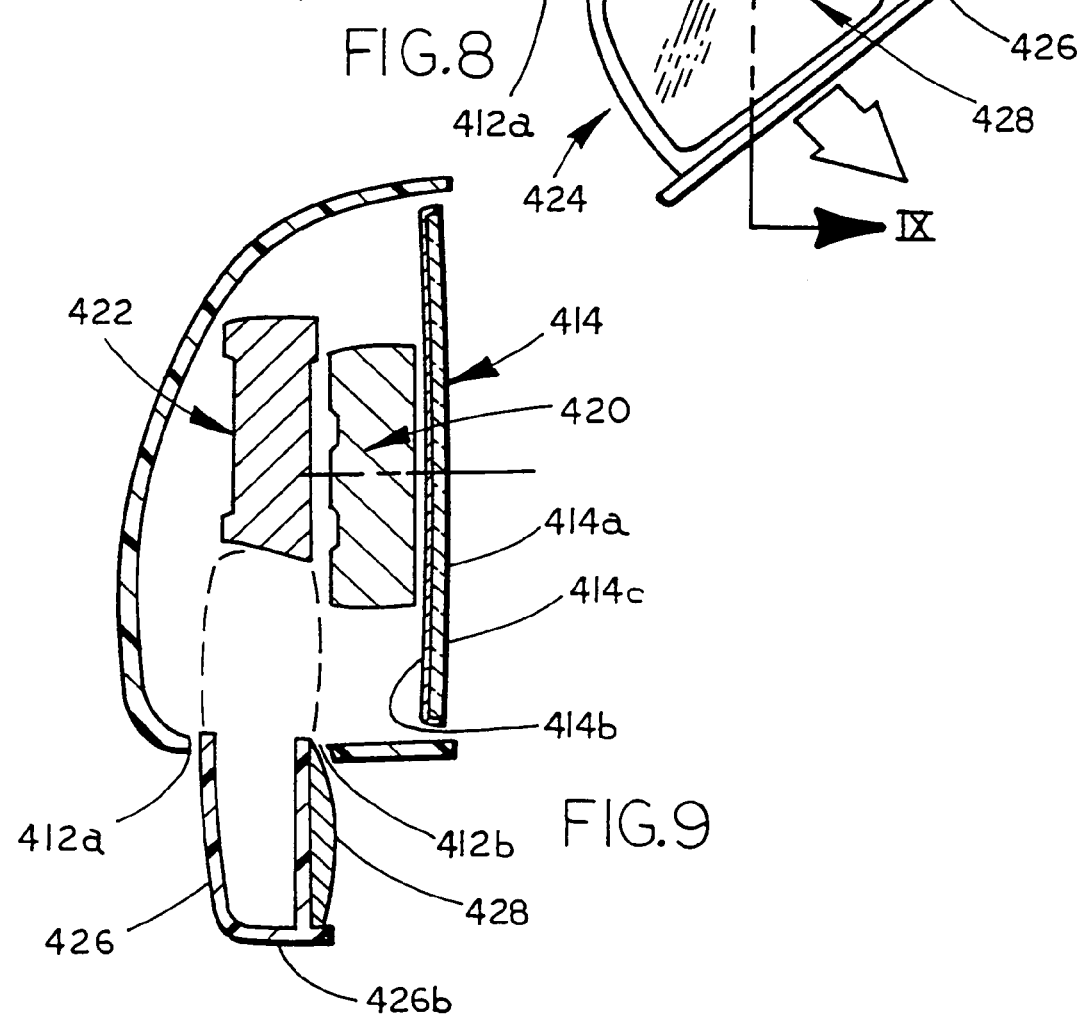

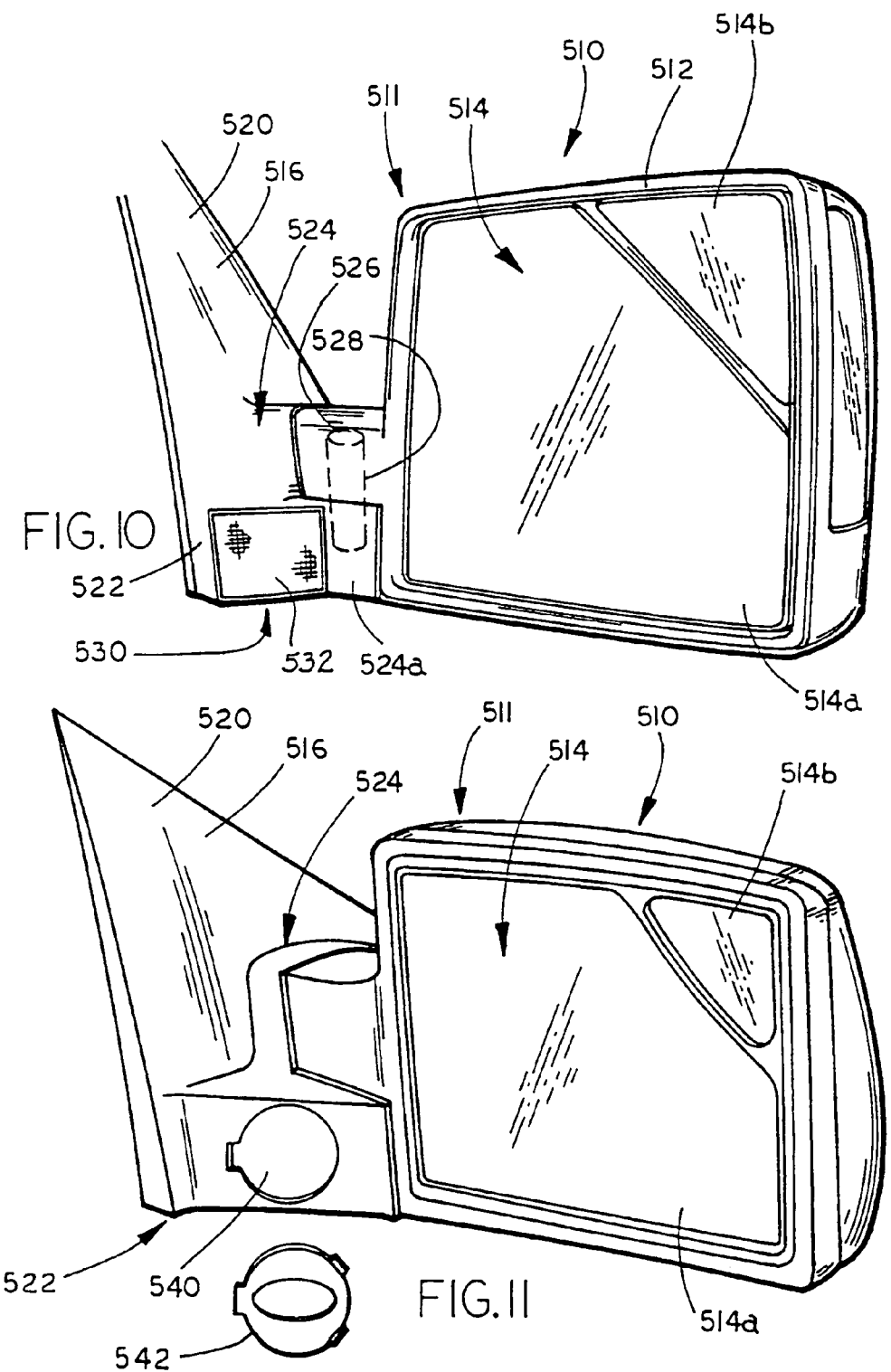

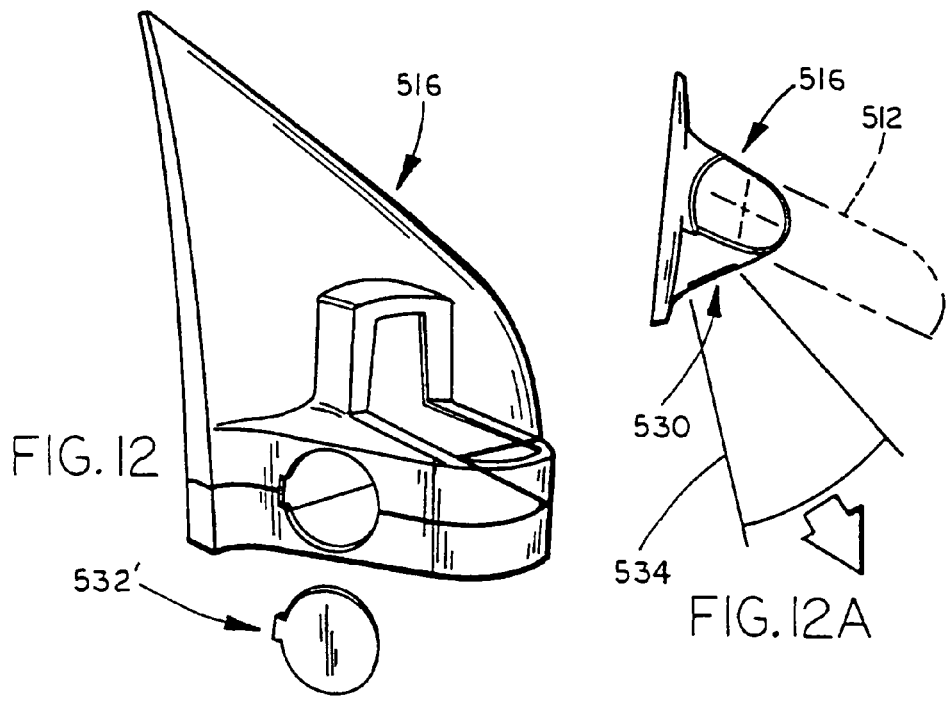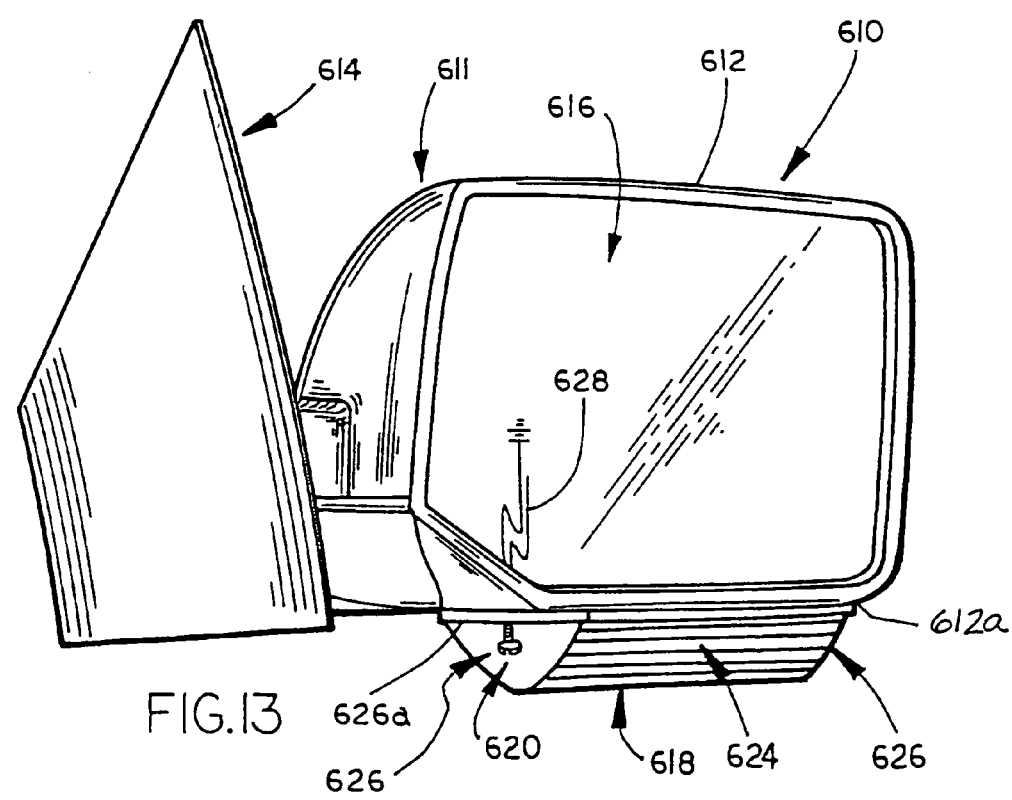

VEHICLE EXTERIOR REARVIEW MIRROR ASSEMBLY

This application is a divisional application of U.S. patent application Ser. No. 10/183,919, filed Jun. 27, 2002 now U.S. Pat. No. 6,916,100, which claims priority from U.S. Provisional Application Ser. No. 60/301,219, filed Jun. 27, 2001, entitled VEHICLE EXTERIOR REARVIEW MIRROR ASSEMBLY, by Applicant Leo W. Pavao, and is incorporated by reference herein in its entirety.

TECHNICAL FIELD AND BACKGROUND OF THE INVENTION

The present invention generally relates to an exterior rearview mirror assembly and, more particularly, to an exterior rearview mirror assembly that generates reduced wind noise.

Most, if not all, exterior rearview mirror assemblies create to varying degrees wind drag, which generates noise that can be heard in the interior of most vehicles. The threshold at which the noise becomes noticeable varies with the aerodynamic properties of the exterior of the mirror assembly, the speed of the vehicle on which the mirror assembly is mounted, and the insulation of the vehicle body. Another consequence of wind drag is decreased fuel economy which becomes more prevalent at higher speeds.

While some mirror assemblies incorporate folding mechanisms, such as break-away mechanisms and/or power-fold mechanisms, which permit, for example, the mirror casing to fold about the mounting portion, conventional vehicular exterior rearview mirror assemblies have a fixed angular orientation with respect to the vehicle for normal operating conditions. Break-away mechanisms permit the mirror casing or movable portion of the mirror assembly to fold against the vehicle when the movable portion is impacted with a force to thereby minimize damage to the mirror assembly when contact is made between the mirror assembly and an object. Power-fold mechanisms are commonly found in European vehicles and are provided to fold the mirror assembly against the side of the vehicle when the vehicle is parked to reduce the width of the vehicle. At lower speeds, the wind drag created by these fixed mirror assemblies may not be noticeable, but at elevated speeds, the noise level may be unacceptable.

Various attempts have been made to reduce the wind noise generated by exterior mirror assemblies. For example, structures have been incorporated into the exterior rearview mirror assembly housing to separate the airflow over the mirror assembly, which reduces turbulence of the airflow over the housing and, hence, reduces the noise. However, these structures are not aesthetically pleasing to some automobile manufacturers. Moreover, the cost of incorporating these various structures into the mirror assembly for some vehicles may be cost prohibitive.

Consequently, there is a need for a mirror assembly that exhibits reduced drag to thereby reduce the wind noise associated with the mirror assembly and, further, all in a manner that can minimize the cost of manufacturing the mirror assembly.

SUMMARY OF THE INVENTION

In the exterior rearview mirror assembly of the present invention, the angular orientation of the movable portion of the mirror assembly is selectively adjusted towards the side of the vehicle body while the vehicle is in motion to reduce the wind drag generated by the mirror assembly, thereby, reducing the wind noise associated with the mirror assembly.

According to one form of the invention, a mirror system comprises an exterior rearview mirror assembly, which includes a fixed portion and a movable portion. The fixed portion is configured to mount to a side of a vehicle, with the movable portion movably mounted to the fixed portion. The movable portion includes a reflective element and a reflective element actuator. The reflective element actuator provides selective adjustment of the orientation of the reflective element to adjust the rearward field of view. The mirror assembly further includes a movable portion actuator for selectively moving the movable portion about the fixed portion between a first viewing position, wherein the movable portion is extended outward of the vehicle at a first angle with respect to the side of the vehicle, and a second viewing position wherein the movable portion is extended outwardly from the vehicle at a second angle with respect to the side of the vehicle. The reflective element actuator is adapted to direct the orientation of the reflective element to a desired orientation to generally maintain the rearward field of view of the reflective element independent of the position of the movable portion. The desired orientation of the reflective element is preferably set or selected by the driver of the vehicle in order to provide a desired, predetermined field of view rearward in the side lane adjacent the side of the vehicle to which the mirror assembly is mounted. When travelling on a highway or the like, the orientation of the reflective element changes dynamically with the speed of the vehicle and varies with changes in the orientation of the movable portion of the mirror assembly in order to maintain generally constant the reflective element's field of view to the desired, predetermined field of view. For example, when the movable portion moves inwardly towards the side body of the vehicle when the vehicle is travelling at a high speed (for example, greater than about 45 miles per hour), the mirror reflector moves outwards relative to the side of the vehicle in order to view a generally constant field of view.

In one aspect, the mirror system includes a control, which actuates the movable portion actuator to move the movable portion, for example, in response to the speed of the vehicle. For example, the control may be adapted to selectively actuate the movable portion actuator in response to the vehicle traveling at one or more pre-selected speeds. In addition, the control may actuate the movable portion actuator to move the movable portion to a first angular position of the movable portion with respect to the side of the vehicle body (and may actuate the reflective element actuator to move the reflective element to a first angular position of the reflective element with respect to the side of the vehicle body) when the vehicle travels at one pre-selected speed and to actuate the movable portion actuator to move the movable portion to a second angular position of the movable portion (and may actuate the reflective element actuator to move the reflective element to a second angular position of the reflective element with respect to the side of the vehicle body) when the vehicle travels at a second pre-selected speed wherein the angle of the first angular position of the movable portion is smaller than the angle of the second angular position of the movable portion when the one pre-selected speed is greater than the second pre-selected speed and wherein the angle of the first angular position of the reflective is greater than the angle of the second angular position of the reflective element when the one pre-selected speed is greater than the second pre-selected speed.

According to another form of the invention, a mirror system for a vehicle includes an exterior rearview mirror assembly and a control. The exterior rearview mirror assembly includes a reflective element, a fixed portion, which is configured to mount to a side of a vehicle, and a movable portion, which is movably mounted to the fixed portion. The reflective element is supported in the movable portion by a reflective element actuator and has a generally rearward field of view when the mirror assembly is mounted to the vehicle. The reflective element actuator provides selective adjustment of the orientation of the reflective element to adjust the rearward field of view. The mirror assembly also includes a movable portion actuator for selectively moving the movable portion between a first viewing position, wherein the movable portion is extended outwardly from the vehicle at a first angle with respect to the side of the vehicle, and a second viewing position, wherein the movable portion is extended outwardly from the vehicle at a second angle with respect to the side of the vehicle. The control selectively actuates the movable portion actuator to move the movable portion about the fixed portion to one of the viewing positions, while the reflective element actuator is adapted to be directed to a desired, preferably driver selected orientation to maintain the rearward field of view of the reflective element independent of the position of the movable portion. In this manner, a driver of the vehicle can pre-select an orientation of the reflective element, which will remain generally unchanged even when the movable portion of the mirror assembly is moved or pivoted closer toward the side of the vehicle.

In one aspect, the mirror system further includes a reflective element support, with the reflective element actuator being supported by the reflective element support in the movable portion.

According to another aspect, the exterior rearview mirror assembly further includes a power-fold mechanism, with the movable portion moving between the viewing positions by actuation of the power-fold mechanism.

In yet another aspect, the reflective element actuator is supported by the movable portion. In addition, the control selectively actuates the reflective element actuator to adjust the orientation of the reflective element to generally maintain the rearward field of view independent of the position of the movable portion.

In yet another form of the invention, a mirror system includes an exterior rearview mirror assembly. The exterior rearview mirror assembly includes a fixed portion, which is configured to mount to a side of a vehicle, and a movable portion, which includes a reflective element and a reflective element actuator and which is movably mounted to the fixed portion. The reflective element actuator provides selective adjustment of the orientation of the reflective element to adjust its rearward field of view. The rearview mirror assembly further includes a movable portion actuator for selectively moving the movable portion and a light assembly provided in the movable portion which generates a sweeping light pattern when the movable portion actuator and light assembly are actuated.

In one aspect, the movable portion actuator is adapted to move the movable portion to a plurality of viewing positions, while the reflective element actuator is adapted to adjust the orientation of the reflective element to be directed to a desired, preferably driver selected orientation to generally maintain the rearward field of view independent of the position of the movable portion.

In a further aspect, the mirror system includes a control which selectively actuates the movable portion actuator to move the movable portion about the fixed portion to one of its viewing positions and selectively actuates the reflective element actuator to direct the orientation of the reflective element to the desired, preferably driver selected orientation to generally maintain the rearward field of view independent of the position of the movable portion.

According to another aspect, the light assembly is preferably provided at an outboard end of the mirror casing. In this manner, when the movable portion is pivoted about the fixed portion, the light assembly generates a light pattern that sweeps at least generally laterally outward from the mirror assembly over a range, which generally corresponds to the movement of the movable portion of the mirror system.

In yet another aspect, the mirror assembly includes two reflective elements, with one of the reflective elements providing a wide-angle view.

According to yet another aspect, the fixed portion of the interior rearview mirror assembly includes a light assembly, which provides a light pattern that extends generally rearwardly and laterally of the vehicle when the mirror system is mounted to the vehicle.

As will be understood, the exterior rearview mirror system of the present invention provides a mirror assembly that creates less drag than conventional fixed mirror assembly designs to thereby reduce wind noise. In addition, the rearview mirror system maximizes the use of components already available in the mirror assembly by modifying or extending their functions to produce a reduced noise mirror assembly at relatively minimal cost increase over existing mirror assemblies.

These and other objects, advantages, purposes, and features of the invention will become more apparent from the study of the following description taken in conjunction with the drawings.

DETAILED DESCRIPTION OF THE DRAWINGS

FIG. 8 is an elevation view of another embodiment of a mirror system of the present invention incorporating a spotter mirror;

FIG. 9 is a cross-section view taken along line IX—IX of FIG. 8;

FIG. 10 is a perspective view of another embodiment of the mirror system of the present invention incorporating a light assembly;

FIG. 11 is a similar view to FIG. 10 illustrating the mirror system with the light assembly removed;

FIG. 12 is an enlarged perspective view of the sail of the mirror system of FIGS. 10 and 11 incorporating a light assembly;

FIG. 12A is a plan view of the sail of FIG. 12 illustrating the light pattern generated by the light assembly when mounted in the sail;

FIG. 13 is a perspective view of another embodiment of the mirror system of the present invention incorporating an external light module;

DETAILED DESCRIPTION OF THE PREFERRED EMBODIMENTS

Figure 1:
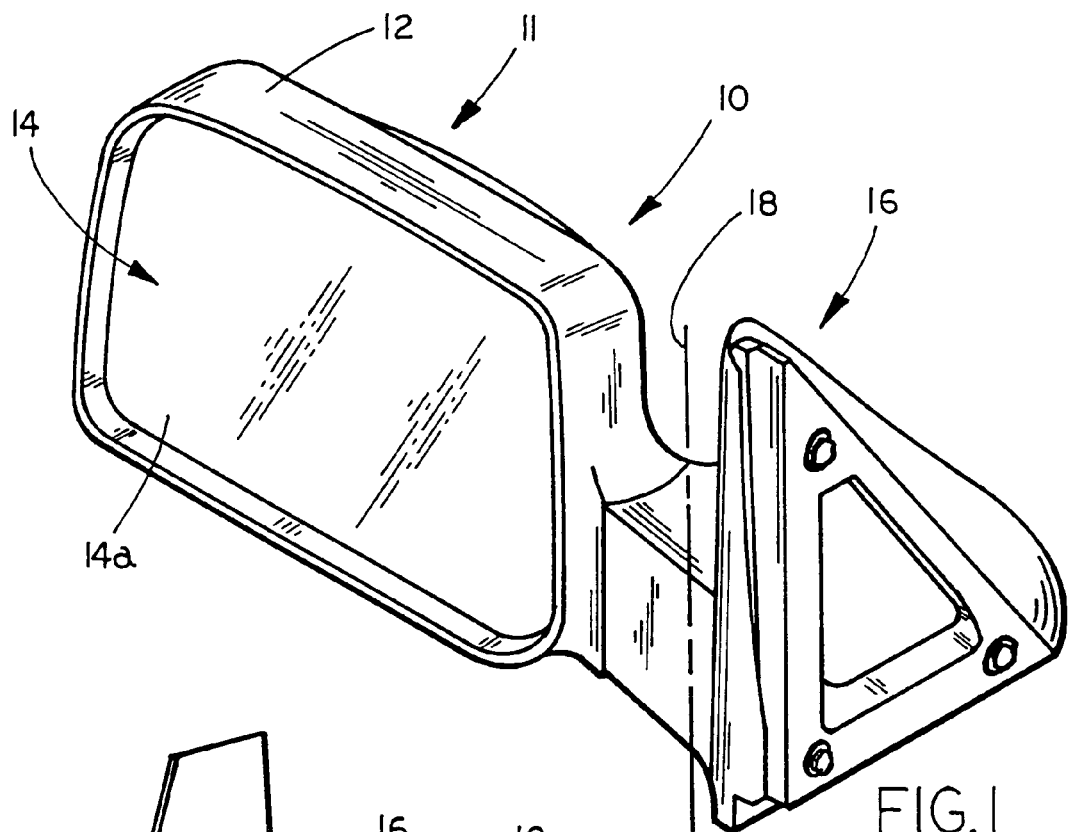
FIG. 1 is a perspective view of a mirror system of the present invention.
Figure 2:
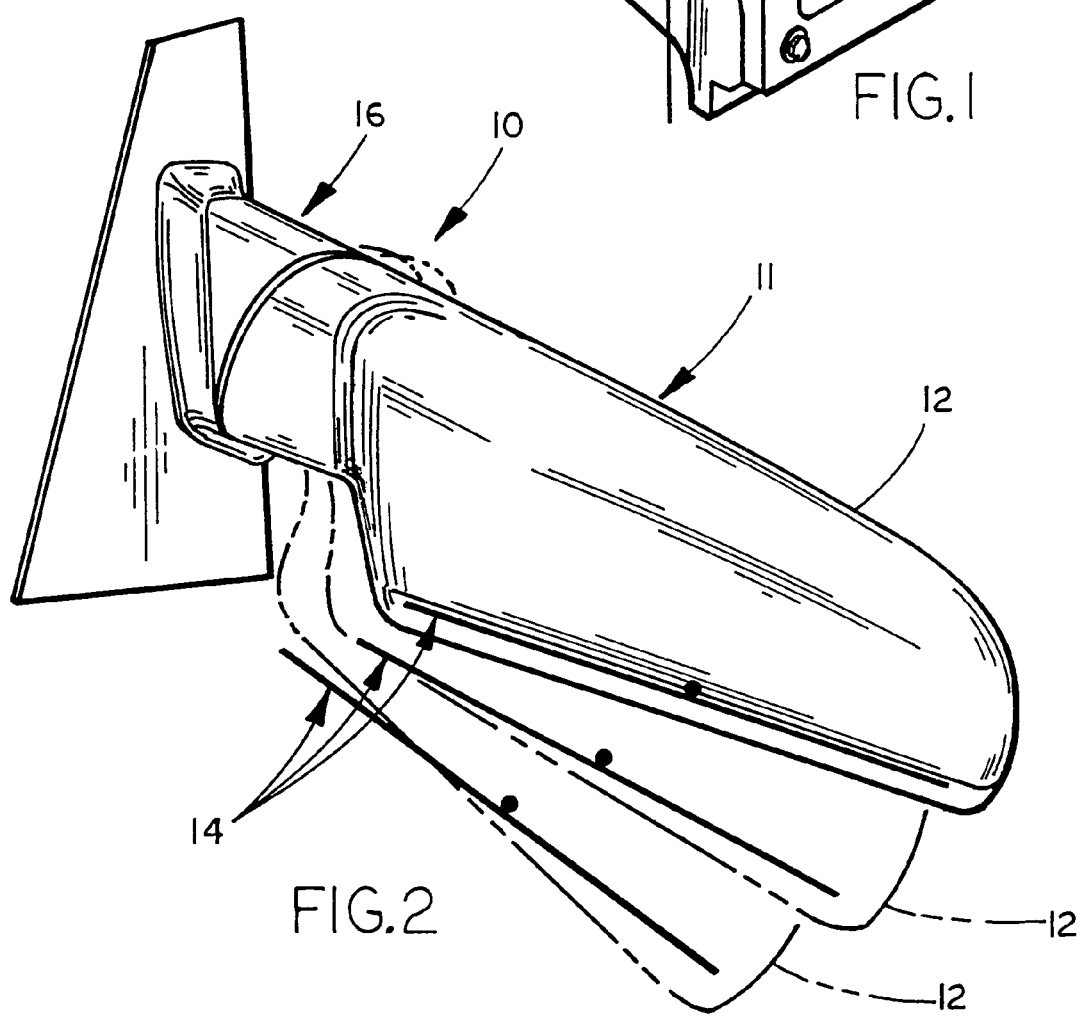
FIG. 2 is a plan view of the mirror system of FIG. 1 illustrating the movable portion of the mirror system moving between a plurality of viewing positions.

Referring to FIGS. 1 and 2, the numeral 10 generally designates a mirror system of the present invention, which includes an exterior mirror assembly 11 that is suitable for mounting to a side of a vehicle. Mirror system 10 is adapted to reduce the drag generated by air flow across exterior rearview mirror assembly 11 by varying the angular orientation of the movable portion or mirror casing of mirror assembly 11, as will be more fully described below.

As best seen in FIG. 1, exterior rearview mirror assembly 11 includes a mirror casing 12 and a reflective element assembly 14, which is housed in mirror casing 12. Casing 12 is preferably a molded housing formed from a plastic material, and, more preferably, formed from a polypropylene or glass nylon filled material. For example, casing 12 may be formed from other suitable materials, such as a polyolefin, and painted or coated with a decorative finish or provided with a skull cap, which may be painted or coated with a decorative finish, such as described in U.S. Pat. applications entitled "COATED EXTERIOR MIRROR HOUSING FOR VEHICLES", Ser. No. 09/348,083, filed Jul. 6, 1999, now U.S. Pat. No. 6,150,014; and "COATED POLYOLEFIN EXTERIOR VEHICLE PARTS AND METHOD FOR MAKING SAME", Ser. No. 09/489,322, filed Jan. 21, 2000, which are herein incorporated by reference in their entireties. Suitable decorative finishes include color finishes, preferably, color finishes that match the body color of the vehicle, wood grain finishes, accent finishes, such as neon colors, designer colors, color patterns, carbon fiber finishes, brushed aluminum finishes, or the like.

Exterior rearview mirror assembly 11 further includes a fixed mounting portion 16, which fixedly mounts mirror assembly 11 to a side panel of a vehicle. In the illustrated embodiment, mirror casing 12 is movably mounted to mounting portion 16 so that casing 12 is pivotal about a pivot axis 18 and is movable between a normal viewing or angular position (as shown in FIG. 1) and one or more folded angular positions (shown in phantom in FIG. 2). As will be described in reference to control system 40 (FIGS. 4 and 5), mirror casing 12 is pivoted or folded inwardly toward the vehicle to reduce the drag on mirror casing 12 in response to the speed of the vehicle or in response to input by, for example, the driver of the vehicle. But in order to maintain the rearward field of view of reflective element assembly 14, the orientation of reflective element assembly 14 is also adjusted to compensate for the repositioning of the mirror casing. In other words, when a driver of the vehicle positions the reflective element assembly in a pre-selected orientation with respect to the vehicle, such as by an actuator (for example, via a joystick or similar reflective element field of view positioning user interface or via a memory mirror system, such as described in U.S. Pat. Nos. 6,163,083; 6,093,976; and 5,796,176, which are incorporated by reference herein in their entireties), that orientation remains generally constant regardless of the angular orientation of the mirror casing. In this manner, the field of view of the reflective element assembly may remain generally constant even when the mirror casing is pivoted or folded.

Figure 3:
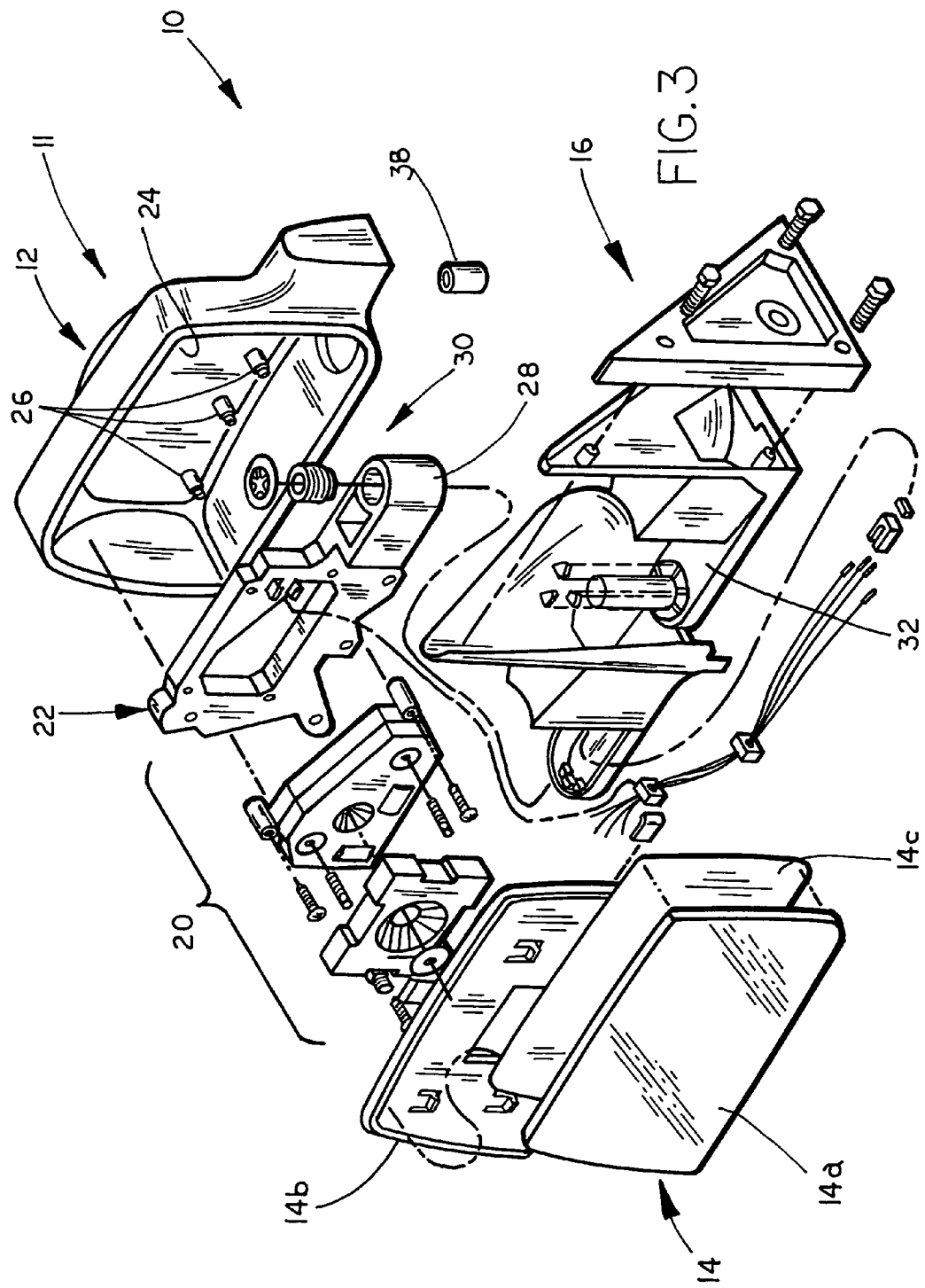
FIG. 3 is an exploded perspective view of the mirror system of FIG. 1.

As best seen in FIG. 3, reflective element assembly 14 includes a reflective element 14a and a backing plate 14b, which supports reflective element 14a in mirror casing 12. Reflective element 14a is secured to backing plate 14b by a conventional method, including mechanical attachment or adhesive attachment, for example by a double-sided adhesive layer 14c. Reflective element 14a may comprise a conventional chrome reflective element formed from a glass or plastic substrate with a chrome or other reflective layer on its first or second surface. Alternately, reflective element 14a may comprise a variable reflectance reflective element, such as an electro-optic mirror element. For examples of suitable variable reflectance mirror elements, reference is made to U.S. patent application Ser. No. 09/350,930, filed Jul. 12, 1999, entitled ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES, to Desaraju V. Varaprasad et al., now U.S. Pat. No. 6,154,306, or such as is disclosed in U.S. Pat. Nos. 5,668,663; 5,724,187; 5,910,854; and 5,239,405, the entire disclosures of which are hereby incorporated by reference herein.

Referring to FIG. 3, mirror reflective element assembly 14 is supported in mirror casing 12 by a reflective element actuator 20, which provides for remote adjustment of reflective element assembly 14 about one or more axes. In the illustrated embodiment, actuator 20 comprises an electrical actuator and provides multi-axis positioning of reflective element assembly 14. For details of suitable actuators, reference is made to U.S. Pat. Nos. 5,900,999; 5,986,364; 6,094,027; 6,037,689; 6,132,052; 6,168,279; 6,213,612; and 6,243,218, which are incorporated in their entireties by reference herein. Actuator 20 is mounted in casing 12 by a support 22. In the illustrated embodiment, support 22 mounts to rear wall 24 of casing 12 on mounting bosses 26. Support 22 includes a support arm 28 which extends through casing 12 to pivotally mount mirror casing 12 on fixed mounting portion 16. In the illustrated embodiment, support 22 mounts mirror casing 12 to mounting portion 16 with a break-away connection 30. Break-away connection 30 urges support arm 28 in frictional engagement with base 32 of mounting portion 16, which frictional engagement is released when a force having sufficient magnitude is applied to mirror casing 12 to overcome the frictional engagement between support arm 28 and base 32. Similarly, support 22 is preferably molded from a plastic material, including for example, a polypropylene or a glass nylon filled material. Support 22 may also be formed from a reinforced polyolefin, such as described in U.S. Pat. No. 6,109,586, which is herein incorporated by reference in its entirety. For further details of suitable break-away mechanisms, reference is made to U.S. Pat. Nos. 6,109,586; 5,903,402; and 5,949,591 and U.S. Provisional Patent Application, Ser. No. 60/225,128, which are incorporated in their entireties by reference herein. Preferably, such exterior mirror components, such as mirror casings, mirror mounting plastic brackets, supports, and the like, are manufactured in molding operations that impart such components with light weight capability but while still maintaining their structural integrity and performance. Such light weight molding methods can include an aerated injection molding process, such as a the MUCELL™ process, such as described in U.S. patent application Ser. No. 09/679,997, filed Oct. 15, 2000, now U.S. Pat. No. 6,669,267 which is herein incorporated by reference in its entirety. Alternately, blow molding can be used during molding of, for example, a plastic mirror bracket, support, or casing or housing, so that the weight of the component is reduced thereby.

In addition, mirror system 10 includes a movable portion actuator 34. Actuator 34 may comprise, for example, a conventional power-fold mechanism and selectively pivots mirror casing 12 (and the various components housed the mirror casing) about a pivot bushing 38 which is mounted in or formed on mounting portion 16. For further details of a power-fold mechanism, reference is made to U.S. Pat. Nos. 6,243,218; 5,210,651; and 5,579,178, which are incorporated by reference in their entireties.

In the illustrated embodiment, mirror system 10 includes a control system 40, which selectively actuates both movable portion actuator 34 and reflective element actuator 20. Control system 40 adjusts the angular orientation of mirror casing 12 about pivot axis 18 to reduce the drag created by mirror casing 12. For example, control system 40 may adjust mirror casing 12 based on the speed of the vehicle or based on the gear in which the vehicle is operating. When the speed of the vehicle increases or reaches a pre-selected magnitude, control system 40 pivots or folds mirror casing 12 inwardly toward the side of the vehicle body to reduce the drag created by mirror casing 12. Similarly, when the vehicle speed reduces below the pre-selected magnitude, control system 40 pivots or folds mirror casing 12 outwardly to its normal operating or home position. Optionally, control system 40 is adapted to provide incremental pivoting or travel of mirror casing 12 about pivot axis 18 based on a vehicle parameter, such as incremental speed changes or changes in gear. For example, control system 40 may pivot mirror casing 12 to a first angular orientation when the vehicle reaches or exceeds a first speed, for example 55 mph, and may pivot the mirror casing 12 to a second, smaller angular orientation when the vehicle reaches or exceeds a second, greater speed, for example 70 mph. Alternately, control system 40 may be adapted to allow the vehicle user to determine when and how far (within certain set limits) to move mirror casing 12.

In addition to controlling the position of mirror casing 12, control system 40 adjusts the orientation of reflective element assembly 14 using actuator 20 to accommodate the repositioning of mirror casing 12. For example, when control system 40 pivots mirror casing 12, control system 40 either generally simultaneously or a short time after adjusts the orientation of the reflective element assembly 14 to maintain the orientation of the reflective element assembly at, for example, a driver's pre-selected orientation, so that the orientation of the reflective element assembly is maintained at the desired orientation regardless of the angular orientation of the mirror casing 12. As would be understood by those skilled in the art, when mirror casing 12 is pivoted inwardly toward the vehicle, the viewing area of reflective element assembly 14 changes and diminishes the rearward field of view of reflective element assembly 14. In order so that the rearward field of view of reflective element assembly 14 is maintained at its desired orientation, control system 40 actuates and adjusts actuator 20 so that the viewing area of reflective element assembly 14 is generally constant regardless of the position of mirror casing 12. To achieve this, control system 40 actuates reflective element actuator 20 to move the reflective element assembly 14 outward as actuator 34 moves mirror casing 12 inward (relative to the side of the vehicle). Similarly, when power-fold mechanism 34 moves mirror casing 12 outwardly (relative to the side of the vehicle), control system 40 actuates actuator 20 to move reflective element assembly inward. In this manner, the driver is allowed to retain the rearward field of view of the reflective element assembly 14 substantially unchanged and independent of the angular orientation of mirror casing 12.

Figure 4:
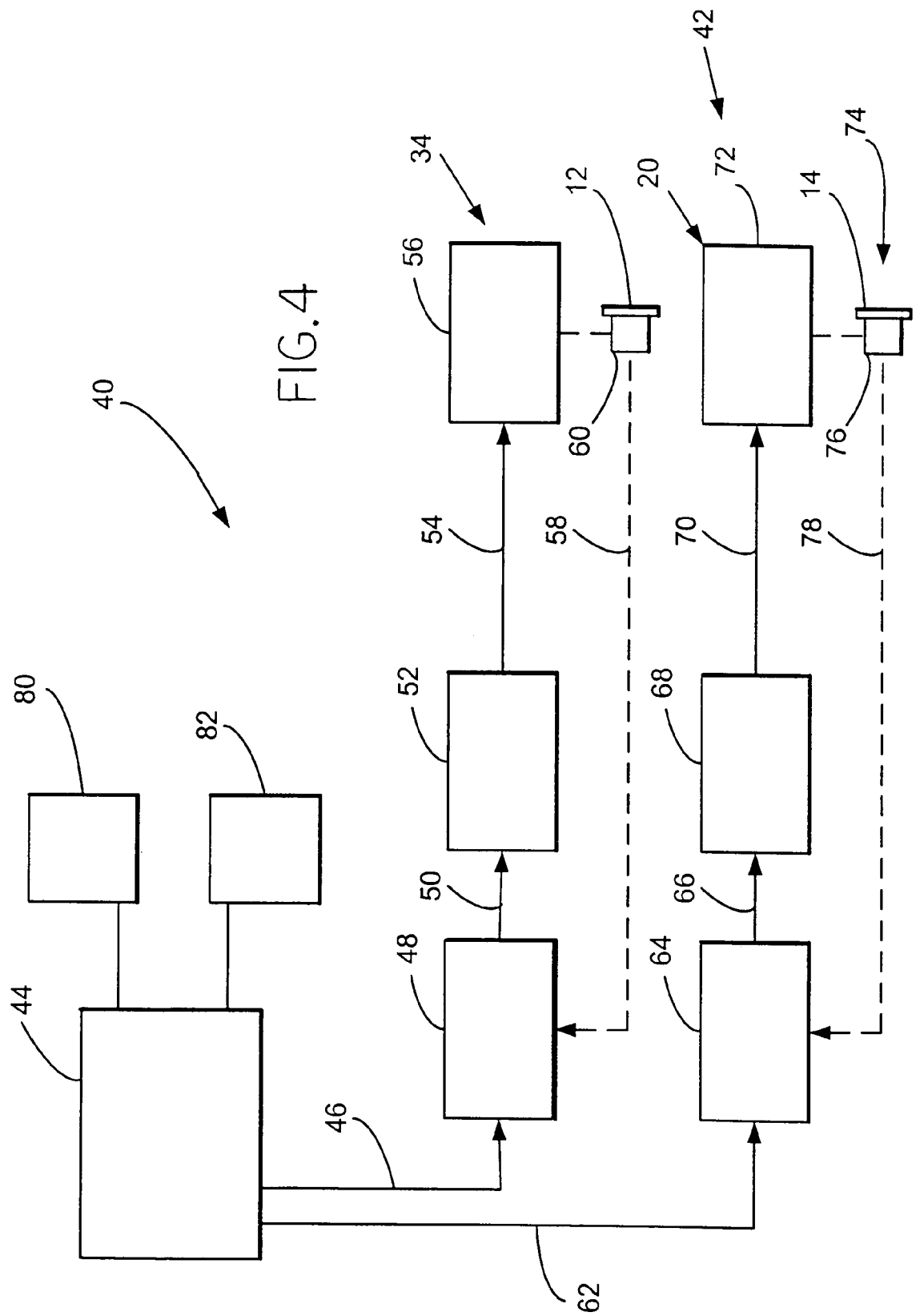
FIG. 4 is a schematic diagram of the control system of the mirror system of FIG. 1.

Referring to FIG. 4, control system 40 includes a mirror casing position and reflective element position monitoring system 42 and a control module 44. Control module 44 generates pulses 46 which are transmitted to a position controller 48 that is provided in power-fold mechanism 34. Position controller 48 generates a signal 50 which is transmitted to a motor driver 52, which in turn generates a drive signal 54 transmitted to motor 56 of power-fold mechanism 34. Control system 40 preferably includes a feedback loop 58 with a potentiometer 60 that monitors the position of mirror casing 12. Control module 44 also generates pulse signals 62 which are input into a position controller 64 that is provided in actuator 20. Controller 64 produces an output 66 to motor driver 68, which generates drive signals 70 to actuate motors 72 of reflective element actuator 20. Similarly, control system 40 includes a feedback loop 74 for actuator 20. Included in feedback loop 74 is a potentiometer 76 that is coupled, such as by mechanical coupling, to reflective element assembly 14 and produces an output signal 78, which is indicative of the orientation of reflective element assembly 14. It should be understood that control module 44 may be positioned anywhere in exterior rearview mirror assembly 11 or inside the vehicle. By including a position monitoring system, control system 40 is capable of driving movable portion/power-fold mechanism 34 until it reaches a desired target position based on the information provided by feedback loop 58. Similarly, control system 40 is capable of driving reflective element actuator 20 until reflective element assembly 14 is in a target position based on the information provided by feed back loop 74. Optionally, control system 40 may include a manual control, such as a mirror positioning switch 80, which may be set by the user of the vehicle to select the desired angular orientation of mirror casing 12. Mirror positioning switch 80 may comprise a joy stick, a switch pod, or a similar manually actuatable device. In addition, control system 40 may include a memory set switch 82, which is operable by the user in order to set memory positions for mirror casing 12. Memory set switch 82 may set memory positions based on, for example, the speed of the vehicle or the gear in which the vehicle is operating.

In addition to controlling the orientation of mirror casing 12 and the actuation of reflective element actuator 20, control system 40 may control other accessories, which may be provided in mirror system 10, such as disclosed in U.S. Pat. No. 5,798,575, which is incorporated by reference in its entirety herein. For example, mirror system 10 may also include: Lights, including signal lights or security lights or light modules, such as disclosed in U.S. Pat. Nos. 5,371,659; 5,497,306; 5,823,654; and 5,669,699, and in commonly assigned, U.S. patent application Ser. No. 09/102,414, filed Jun. 22, 1998 by Pastrick et al., now U.S. Pat. No. 6,176, 602; Ser. No. 09/335,010, filed Jun. 17, 1999 by Pastrick et al., now U.S. Pat. No. 6,276,821; and Ser. No. 60/271,466, filed Feb. 26, 2001; sensors, such as exterior temperature sensors; and cameras, such as disclosed in commonly assigned U.S. Pat. No. 5,670,935; or the like, the disclosures of which are hereby incorporated herein by reference in their entireties.

Figure 5:
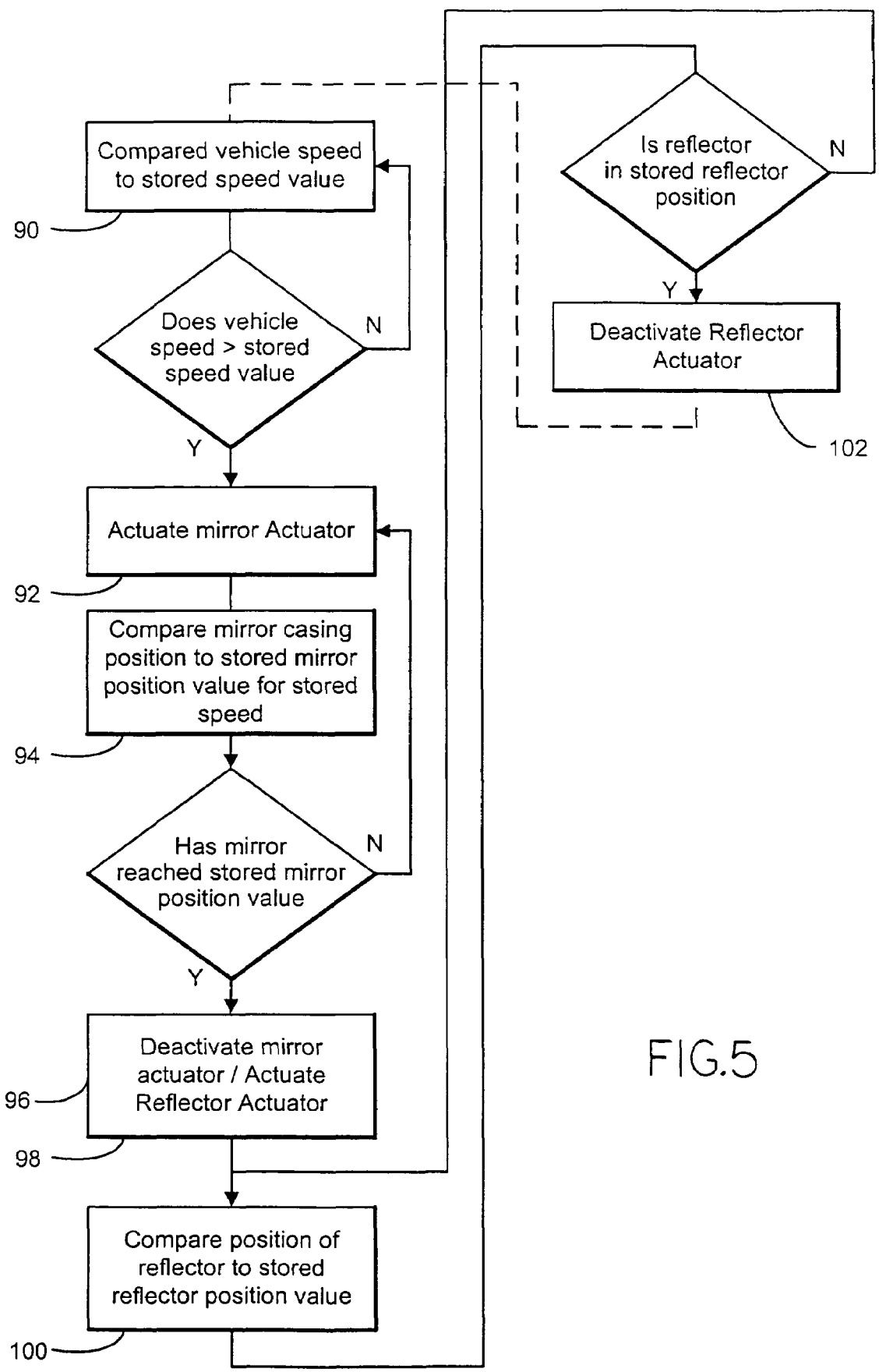
FIG. 5 is a flow chart illustrating the control system of FIG. 4.

Referring to FIG. 5, when based on speed, control system 40 compares the speed of the vehicle to a stored speed value 90. Though it should be understood that other values, such as gear values or the like, may be used for comparison. If the speed of the vehicle is greater than the stored speed value, control system 40 actuates movable portion actuator 34 (92). Control system 40 monitors the orientation or position of mirror casing 12 and compares the mirror casing position to a stored mirror position value for that particular speed 94. When the mirror casing reaches the position that corresponds to the stored mirror position value, then control system 40 deactivates or de-energizes the power-fold mechanism 34 (96). In addition, control system 40 actuates reflective element actuator 20 to adjust the orientation of reflective element assembly 14 (98). Control system 40 monitors the position of reflective element assembly 14 using potentiometer 76 and compares the reflective element assembly position to a stored reflector position value associated with the stored mirror position value (100) that corresponds to the orientation of the mirror casing. When the reflective element actuator 20 has adjusted the reflective element assembly to reach the stored reflector position value, control system 40 ceases generating drive signal to reflective element actuator 20 (102). As the speed of the vehicle decreases or increases, control system 40 continues to monitor the speed of the vehicle to either return mirror casing 12 to its original or home position or further adjust the mirror casing to another angular orientation. For example, control system 40 may be programmed to adjust the angular orientation of mirror casing 12 in response to the vehicle reaching more than one pre-selected value. In which case, control system 40 may further adjust mirror casing 12 to a second stored mirror position value which corresponds to a second stored speed value and likewise adjust reflective element actuator 20 to a second stored reflector position value that corresponds to the second stored mirror position value.

In this manner, the mirror system of the present invention provides an exterior mirror assembly in which the movable portion, typically the mirror casing, is moved to reduce the drag of exterior rearview mirror assembly 11 while adjusting the reflective element to at least generally maintain the field of view of the reflective element assembly substantially unchanged at its pre-selected orientation and, therefore, independent of the orientation of mirror casing 12. As the mirror sweeps inward to the side of the vehicle when the speed increases, the associated drag and wind noise is reduced. In addition, as the mirror sweeps inward toward the side of the vehicle, the reflective element assembly is pivoted outboard to minimize, if not eliminate, the field of view loss.

Figure 6A:
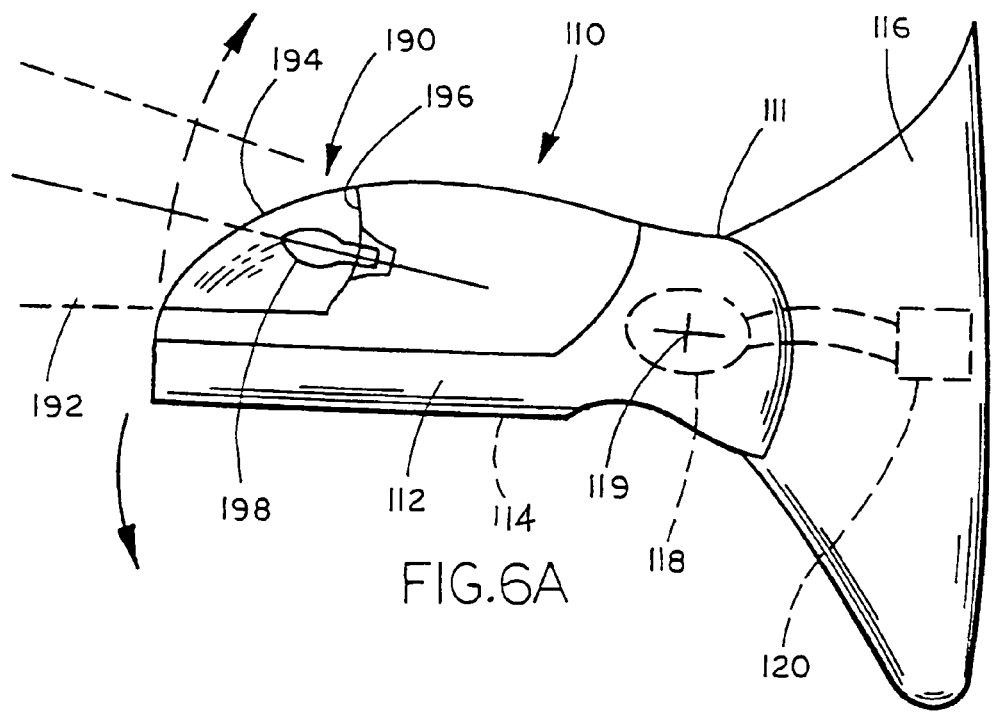
FIG. 6A is a top plan view illustrating another embodiment of the mirror system of FIG. 1 incorporating a light assembly.

Referring to FIG. 6A, mirror system 110 includes an exterior mirror assembly 111 and a light emitting element such as a light assembly 190, which provides a light pattern 192 and which may be used as a spot light or the like. Mirror assembly 111 includes a fixed or mounting portion 116 and movable portion 112, which is movably mounted to the fixed portion and houses a reflective element assembly 114 similar to the previous embodiment. In addition, mirror assembly 111 includes a movable portion actuator, such as a power-fold mechanism 118. Power-fold mechanism 118 folds the mirror casing or movable portion about a pivot axis 119 on fixed portion 116, for example, when the vehicle on which the mirror assembly is mounted is driven into a tight space, such as in a parking lot or garage to reduce the width of the vehicle. Power-fold mechanism 118 can be actuated by the driver using a control, such as a switch, or by a sensor, such as a proximity detector, which generates an actuation signal when the mirror assembly comes in close proximity to an object.

In the illustrated embodiment, mirror system 110 includes a control 120 which adjusts the orientation of mirror casing 112 about fixed portion 116 by actuating power-fold mechanism 118 in response to input from an occupant of the vehicle, such as the driver. Control 120 may be located in the mirror assembly or elsewhere in the vehicle and includes a user actuatable device, such as a switch, which is accessible by the occupant and which actuates power-fold mechanism 118 and light assembly 190. Optionally, control 120 may be configured to actuate the power-fold mechanism and the reflective element actuator similar to the previous embodiment to reduce the wind noise produced by mirror assembly 111 while maintaining the field of view of reflective element assembly 114 at a pre-selected orientation, which is independent of the position of the mirror casing.

In the illustrated embodiment, the control system selectively actuates and deactivates light assembly 190, for example, in response to input signals from an occupant of the vehicle. For example, the control system may be configured to actuate light assembly 190 while actuating the power-fold mechanism to fold the folding portion of mirror assembly 111 to its folded position so that light pattern 192 sweeps an area adjacent the side of the vehicle as the power-fold mechanism moves movable portion or casing 112 about fixed portion 116. The sweeping beam of light is particularly useful for safety or security purposes when the vehicle is parked and not in motion. For example when driving into a dark parking garage or building, the occupant of the vehicle may wish to illuminate the area adjacent the vehicle to make sure that there is enough room to park or to make sure that the space next the vehicle is free of obstacles and/or persons. Optionally, the control system may include a lock-out, such as a lock-out circuit, so that light assembly 190 can not be used while the vehicle is being driven. Such lock-out circuits are conventional, and one such suitable circuit is described in U.S. Pat. No. 5,371,659, which is incorporated by reference in its entirety.

As viewed in FIG. 6A, light pattern 192 extends generally outward and laterally from the vehicle. Depending on the optics of the light assembly cover 194 and/or optional reflector 196 and/or directionality of light source 198, the light generated by light source 198 may also extend downwardly to illuminate the ground area next to the side of the vehicle. Suitable light sources for light assembly 190 include an incandescent light source, a fluorescent light source, such as a cold cathode fluorescent light source, a phosphorous light source, a neon light source, a discharge light source, an arc light source, an electroluminescent light source (including inorganic or organic electroluminescent light sources), a laser diode light source, a solid state emitter light source (such as light emitting diode (LED)), a light pipe light source, or the like, or the light module described in co-pending U.S. provisional application entitled VEHICULAR NON-INCANDESCENT LIGHT MODULE, Ser. No. 60/271,466, filed Feb. 26, 2001, which is incorporated by reference in its entirety.

Optionally, light assembly 190 comprises a unitary light module, which is electrically connected to, for example, a vehicle area network or the vehicle ignition system. For examples of a vehicle area network, reference is made to U.S. Pat. Nos. 6,175,164 and 5,959,367, the disclosures of which are hereby incorporated herein by reference in their entireties.

Figure 6B:
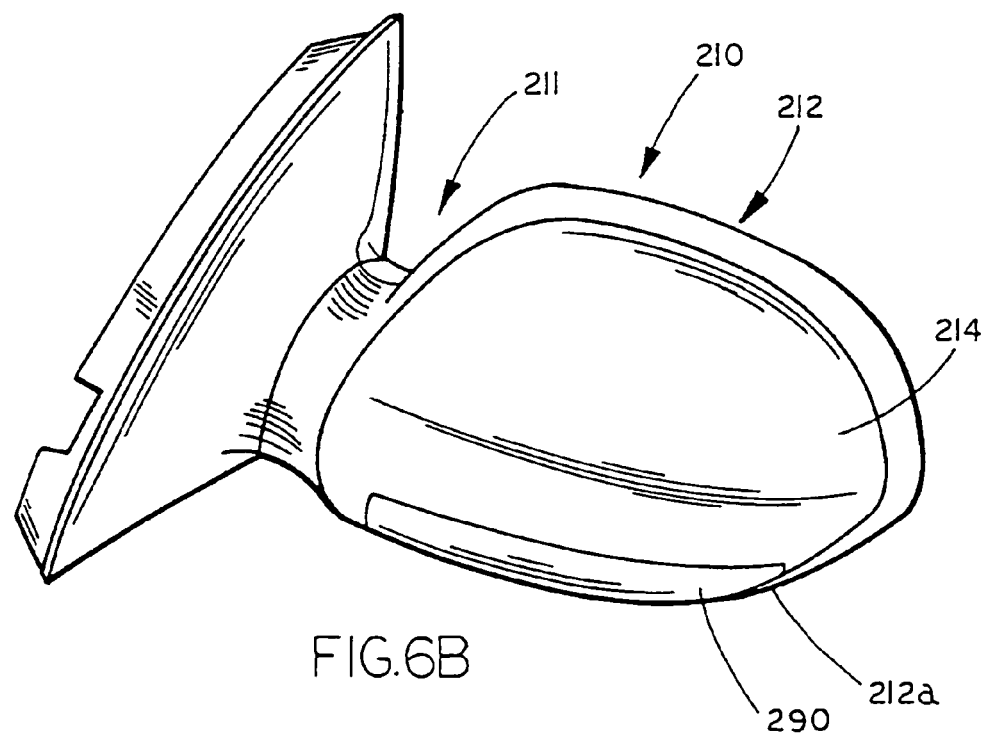
FIG. 6B is an elevation view illustrating another embodiment of the mirror system of FIG. 1 incorporating a reflector.

Referring to FIG. 6B, mirror system 210 includes an exterior rearview mirror assembly 211 and a control (not shown) similar to the previous embodiment. In the illustrated embodiment, mirror casing 212 incorporates a light reflecting element in the form of a reflector 290. Reflector 290 is preferably mounted at a side of mirror casing 212 that faces oncoming traffic. In the illustrated embodiment, reflector 290 is located at a leading edge 212a of casing 12. Reflector 290 may comprise an applique or a material coating, which is painted on, molded with, or attached to mirror casing 212. Reflector 290, for example, may incorporate retro-reflective surfaces or reflective or refractive particles to form a passive warning system which emits, reflects, or refracts light when light is directed onto reflector 290. Alternately, reflector 290 may be formed by a coating of a luminous or phosphorescent paint, coating, or the like. Reflector 290 thus functions as a reflector of headlights of approaching/oncoming vehicles, thus enhancing the visibility and conspicuity of the vehicle equipped with the exterior mirror assembly of this present invention.

In the illustrated embodiment, mirror casing 212 incorporates a shell or skull cap 214, with reflector 290 incorporated into skull cap 214. For example, skull cap 214 may be molded or painted or otherwise decorated with reflector 290. For example of a suitable skull cap and method to incorporate reflector 290, reference is made to U.S. Pat. application entitled CONSOLIDATED EXTERIOR SIDEVIEW MIRROR ASSEMBLY INCORPORATING AN IN-MOLD FILM PROCESS, Ser. No. 09/564,665, filed May 1, 2000, now U.S. Pat. No. 6,310,738, which is incorporated by reference in its entirety herein. In this manner, reflector 290 enhances the visibility and conspicuity of the vehicle.

Figure 7:
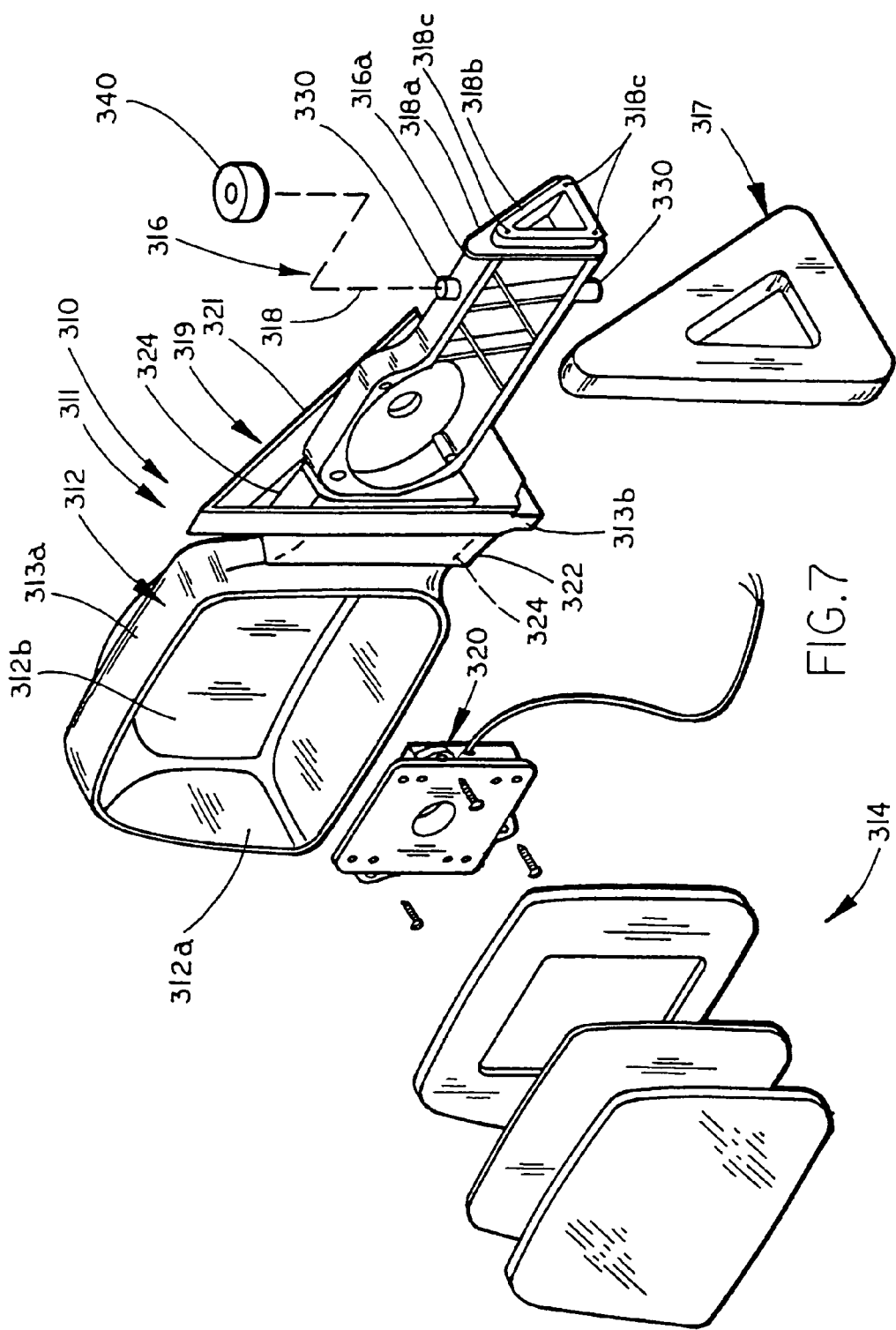
FIG. 7 is an exploded perspective view of another embodiment of the mirror system of the present invention.

Referring to FIG. 7, the numeral 310 designates yet another embodiment of the mirror system of the present invention. Mirror system 310 includes an exterior rearview mirror assembly 311 and an optional control similar to the first embodiment. Mirror assembly 311 includes a housing 312 and a reflective element assembly 314, which is supported in mirror housing 312 by an actuator 320. Housing 312 includes a first portion 313a, which forms a mirror casing, and a second portion 313b which forms a sail. Housing 312 is mounted to a side of a vehicle by a support bracket 316, which extends through housing 312 on one end and mounts directly to a panel or vehicle door. Mounting end 316a of mounting bracket 316 includes a generally triangular-shaped mounting flange 318a and triangular-shaped base 318b, which includes a plurality of mounting openings 318c for receiving fasteners for mounting bracket 316 to the vehicle. Optionally, mounting flange 318a and base 318b are mounted to the vehicle through a triangular-shaped adapter member 317, which adapts the mounting of the mirror assembly to the door frame of the vehicle. It should be understood, therefore, that the size and shape of adapter member 317 may change depending on the configuration of the vehicle door. Sail 313b forms a cover 319 which includes a triangular base 321 that extends over adapter member 317 and a tapered down neck 322 which provides the transition between mirror casing 312 and sail 313b. Neck 322 receives an extended portion 324 of casing 312a and is adapted to permit pivoting of mirror casing 312 in cover 319 without binding.

Similar to the previous embodiments, mirror casing 313a is mounted to permit mirror casing 313a to pivot about a pivot axis 318 so that mirror casing 312 can be folded toward the vehicle to reduce the drag and hence wind noise associated with the exterior rearview mirror assembly 311. However, in the illustrated embodiment, reflective element actuator 320 is mounted to mounting bracket 316 such that mounting bracket and actuator 320 remain stationary with respect to the vehicle. In this manner, the orientation of reflective element assembly 314 is independent of the orientation of mirror casing 313a.

Mirror casing 313a is pivotally mounted on support bracket 316 by pivot bushing 330, which extends above and below bracket 316 along pivot axis 318. Furthermore, exterior rearview mirror assembly 311 includes a movable portion actuator, such as a power-fold mechanism 340, which pivots mirror casing 312 about bushing 330 to thereby pivot casing 312 relative to fixed support bracket 316. As will be understood by those skilled in the art, in order to accommodate the relative movement between casing 312 and support bracket 316, support bracket 316 is extended into mirror casing 312 but spaced from end wall 312a and back wall 312b. In addition, reflective element assembly 314 is dimensioned to also permit relative movement of casing 312 about pivot axis 318 without the interference.

Power-fold mechanism 340 is actuated by a control system similar to control system 40 described in reference to the first embodiment. However, the control system for mirror system 310 provides adjustment to power-fold mechanism 340 only, since the movement of mirror casing 312 about support bracket 316 does not impact the orientation of reflective element assembly 314. In this manner, mirror assembly 310 includes a mirror casing that can be selectively pivoted or folded toward the vehicle in a manner to reduce drag and associated wind noise while maintaining the orientation of reflective element assembly 314 generally constant to maintain the driver selected viewing area of the reflective element.

Referring to FIGS. 8 and 9, the numeral 410 generally designates another embodiment of a mirror system of the present invention. Mirror system 410 includes an exterior rearview mirror assembly 411. Mirror assembly 411 includes a mounting portion 416 and a mirror casing 412, which is pivotally mounted to mounting portion 416 about a pivot axis 418. Mounting portion 416 is adapted to mount mirror assembly 410 to a side of a vehicle. Alternately, mirror casing 412 may be fixedly mounted to mounting portion 416 to provide a fixed configuration mirror assembly.

In the illustrated embodiment, mirror casing 412 is pivotally mounted to mounting portion 416 by a break-away mechanism, such as described in U.S. Pat. No. 6,109,586 or U.S. Pat. No. 6,168,279, the disclosures of which are incorporated by reference in their entireties. Mounted in casing 412 is a reflective element assembly 414. Similar to the previous embodiments, reflective element assembly 414 includes a reflective element 414a and a backing plate 414b and a layer of adhesive 414c which secures element 414a to backing plate 414b. Preferably, reflective element assembly 414 is adjustable and is supported in mirror casing 412 by a reflective element actuator 420, which provides adjustment about one or more axes, as is known in the art. Actuator 420 may comprise an electrical actuator, a manual actuator, or a cable actuator, such as a BODEN cable actuator. Actuator 420 mounts to a mounting bracket 422, which supports actuator 420 and reflective element assembly 414 in mirror casing 412. For example, mounting bracket 422 may be of the type disclosed in U.S. Pat. No. 6,109,586. In addition, mirror assembly 411 may incorporate a power-fold mechanism, which may be used to fold mirror casing 412 to reduce the width of the vehicle and/or to reduce the wind nose generated by mirror assembly 411, as described in reference to the previous embodiments.

Referring again to FIG. 8, mirror assembly 411 further includes a spotter mirror assembly 424. In the illustrated embodiment, spotter mirror assembly 424 is mounted for extension from and retraction into mirror casing 412 so that spotter mirror assembly 424 may be stowed or stored when not in use. As best seen in FIG. 9, spotter mirror assembly 424 includes a carrier member 426 and a spotter mirror reflective element 428, such as a curved reflective element. The degree of curvature of reflective element 428 may be uniform across the substrate or may be varied. For example, reflective element 428 may comprise an aspheric or multi-radiused reflective element described in application entitled EXTERIOR MIRROR PLANO-AUXILIARY REFLECTIVE ELEMENT ASSEMBLY, filed Jan. 6, 2000, Ser. No. 09/478,315, now U.S. Pat. No. 6,522,451, the disclosure of which is incorporated by reference in its entirety herein.

In the illustrated embodiment, outboard end 426*a* of carrier 426 is mounted to a bottom wall 412*a* of casing 412 by a hinge to provide a pivotal mounting of spotter mirror assembly 424 in mirror casing 412. Alternately, spotter mirror assembly 424 may be mounted to mounting bracket 422. Referring again to FIG. 9, bottom wall 412*a* includes an opening 412*b* into which spotter mirror assembly 424 pivots when spotter mirror assembly 424 is moved to a retracted position within casing 412 (as shown in phantom lines in FIG. 9). In this manner, when spotter mirror assembly 424 is extended from casing 412, the driver of the vehicle will have full use of the viewing area 414*a* of reflective element assembly 414 and, further, have the additional viewing area provided by reflective element 428. However, when the driver of the vehicle no longer is in need of spotter mirror assembly 424, spotter mirror assembly 424 may be moved up into casing 412 behind reflective element assembly 414 and, further, behind actuator 420 to store the spotter mirror assembly 424 for later use. When spotter mirror assembly 424 is pivoted to its stowed position, spotter mirror assembly 424 preferably does not protrude into the slip stream of mirror assembly 410 to thereby minimize the impact on the aerodynamic properties of the mirror assembly. In addition, as best understood from FIG. 9, when spotter mirror assembly 424 is pivoted to its closed or stowed position, its lower or bottom wall 426*b* generally follows the contours of casing 412 and is substantially flush with bottom wall 412*a* of casing 412. Optionally, carrier 426 is formed from the same material as casing 412 of mirror assembly. In addition, carrier 426 may be coated or painted to at least generally match or to provide an accent color to the exterior color of casing 412 so that when spotter mirror assembly 424 is pivoted to its stowed position, spotter mirror assembly 424 does not detract from the overall aesthetic appearance of mirror assembly 410.

Optionally, spotter mirror assembly 424 may be manually moved between its retracted and extended positions. For example, spotter mirror assembly 424 may incorporate a spring latch mechanism which releases to allow spotter mirror assembly 424 to pivot to its extended viewing position below casing 412 when bottom wall 426*b* of carrier 426 is pressed. In order to facilitate manual actuation, wall 426*b* of carrier may incorporate one or more tactile structures, such as a depression, that a person's finger can detect by touch alone. In this manner a person can reach out through the window and, after detecting the tactile structures and thereby locating the spotter mirror assembly, press upward against the spotter mirror assembly to release the latch and thereby permit the spotter mirror assembly to pivot to its extended position for viewing by the driver. As would be understood, this manual actuation can be done without distracting the driver's attention from his or her forward view since the driver can locate and actuate the spotter mirror assembly without looking toward the exterior rearview mirror assembly.

Alternately, spotter mirror assembly 424 may be driven to move or pivot between its extended and retracted positions by a driver mechanism, such as a motor, which can be located in mirror casing 412 or elsewhere in the vehicle. The driver mechanism of spotter mirror assembly 424 preferably couples to a control system, such as a vehicle area network, or may directly couple to the vehicle ignition system. Preferably, a control or trigger device, such as a switch or toggle, is located within the vehicle so that a driver or occupant of the vehicle may actuate the driver mechanism to move the spotter mirror assembly between its retracted and extended positions by simply actuating the control or trigger device.

Referring to FIG. 10, another embodiment 510 of a mirror system of the present invention is illustrated. Mirror system 510 includes an exterior rearview mirror assembly 511 and an optional control similar to the previous embodiments. Rearview mirror assembly 511 includes a mirror casing 512 and a mounting portion 516 on which mirror casing 512 is pivotally mounted. Casing 512 is pivoted about mounting portion 516, for example, by a break-away mechanism and/or a power-fold mechanism similar to the previous embodiment. Break-away and power-fold mechanisms are commonly known in the art; for further details reference is made to the below noted patents. In the illustrated embodiment, mirror casing 512 houses a reflective element assembly 514, which includes a plano-reflective element 514*a* and a curved or bent reflective element 514*b*, such as an aspheric or multi-radiused reflective element described in application entitled EXTERIOR MIRROR PLANO-AUXILIARY REFLECTIVE ELEMENT ASSEMBLY, filed Jan. 6, 2000, Ser. No. 09/478,315, now U.S. Pat. No. 6,522,451. In addition, as will be described in greater detail below, mirror assembly 511 incorporates a light assembly 530, which may be adapted to provide a signal light or to provide a security light.

In the illustrated embodiment, mounting portion 516 comprises a triangular-shaped-mirror sail and includes a mounting flange 520 and a base 522. Base 522 includes a stepped configuration forming an L-shaped bracket 524 for receiving an extended arm or portion 526 of mirror casing 512. Extending between lower leg 524*a* of bracket 524 and arm 526 is a pivot bushing 528 on which casing 512 is pivotally mounted to thereby pivotally mount mirror casing 512 to mounting portion 516. Housed in arm 526 and lower leg portion 524*a* is the break-away mechanism and/or power-fold mechanism. For examples of suitable break-away mechanisms and/or power-fold mechanisms, reference is made herein to U.S. Pat. Nos. 6,168,279; 6,109,586; 5,949,591; 6,243,218; 5,210,651; and 5,579,178, which are incorporated by reference herein in their entireties.

Mounted in base 522 is light assembly 530. Light assembly 530 is angled with respect to mounting flange such that light assembly 530 directs a pattern of light generally outwardly and laterally from the vehicle. Light assembly 530 is particularly suitable for use as a signal light for passing vehicles. In which case, light assembly 530 produces a colored light that may be produced by an amber colored lens, amber colored light source, and/or a filter. Preferably, light assembly 530 includes an optical lens 532 that directs light in a light pattern that is laterally directed substantially away from the side of the vehicle so that the driver of the vehicle does not directly intercept the pattern of light, although a minor intensity (such as 10%) of the pattern may be intercepted by the driver in order to provide awareness to the driver the actuation of the signal light. Alternately or in addition, light assembly 530 may incorporate an optical element, such as a reflector, which directs the light in the desired pattern of light. In this manner, a person driving a vehicle next to the vehicle mounted with exterior rearview mirror assembly 511 of the present invention can view signal light assembly 530 when passing the vehicle, for example after the driver of the adjacent vehicle has lost visual contact with the rear turn signals of the vehicle and before the driver can view the forward facing turn signals of the vehicle.

The light source for signal light assembly 530 may be supplied as a conventional incandescent or halogen light source or a non-incandescent light source, such as described in co-pending U.S. provisional application entitled VEHICULAR NON-INCANDESCENT LIGHT MODULE, Ser. No. 60/271,466, filed Feb. 26, 2001, which is incorporated by reference in its entirety. For example, the light source may be provided by a conventional incandescent fuse light source or a vacuum fluorescent light source, which are available in a variety of colors. In addition, the light source may be provided by a light emitting diode or a fiber optical bundle which forms a light pipe that may be positioned behind lens 532. As noted above, lens 532 is preferably an optical lens and may comprise a segmented lens, a prismatic lens, or a Fresnel lens in order to generate the desired light pattern and may use diffractive optics or refractive optics or their combination.

Referring to FIG. 11, signal light assembly 530 is mounted in an opening 540 in base 522. Optionally, when signal light assembly 530 is not chosen as an accessory by the purchaser of the vehicle, mirror assembly 511 may incorporate a cover or cap 542 which covers the opening and which may incorporate an emblem, for example, an emblem of the manufacture of the vehicle.

Referring to FIG. 12, the light assembly may incorporate a round lens 532' or a rectangular lens (as shown in FIG. 10). As best seen in FIG. 12A, light pattern 534 is directed generally laterally and rearwardly of the vehicle to illuminate regions of entry or exit, such as adjacent the front or rear doors of the vehicle. As noted above, light assembly 530 may comprise a security light assembly which emits, for example, a white light. When used as a security light, light assembly 530 may be adapted to direct light laterally away from the vehicle and generally downwardly to illuminate a ground area adjacent the vehicle. For examples of suitable security lights and signal lights, reference is made herein to U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and U.S. paent application Ser. No. 09/596,015, now U.S. Pat. No. 6,296,379; Ser. No. 09/641,371, now U.S. Pat. No. 6,299,333; Ser. No. 09/335,010, now U.S. Pat. No. 6,276,821; and Ser. No. 09/630,332, now U.S. Pat. No. 6,280,069, all of which are incorporated by reference in their entireties herein.

Referring to FIG. 13, the numeral 610 generally designates another embodiment of the mirror system of the present invention. Mirror system 610 includes an exterior rearview mirror assembly 611 and an optional control similar to those described in the previous embodiments. Exterior rearview mirror assembly 610 includes a mirror casing 612 and a mounting portion 614, which mounts mirror casing 612 to a vehicle. Mirror casing 612 may be pivotally mounted to mounting portion 614 in which mirror casing 612 may be optionally adapted to fold closer to the vehicle to reduce the wind drag. Alternately, mirror casing 612 may comprise a fixed position mirror assembly in which mirror casing 612 and mounting portion 614 are rigidly connected and may be formed as a unitary housing, as will be understood by those skilled in the art. Mounted in mirror casing 612 is a reflective element assembly 616. For further details of suitable reflective element assemblies, reference is made to the previous embodiments.

Figure 14:
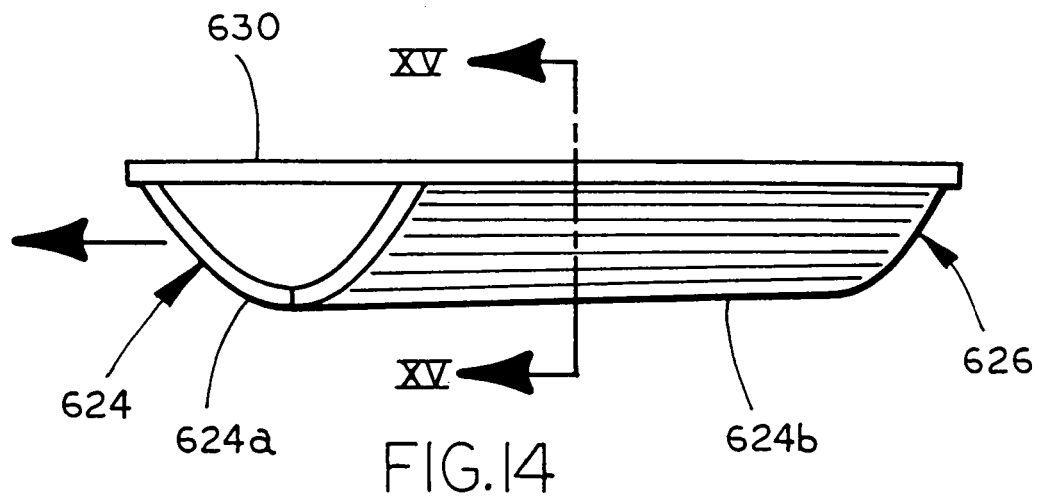
FIG. 14 is an enlarged view of the light module of FIG. 13.
Figure 15:
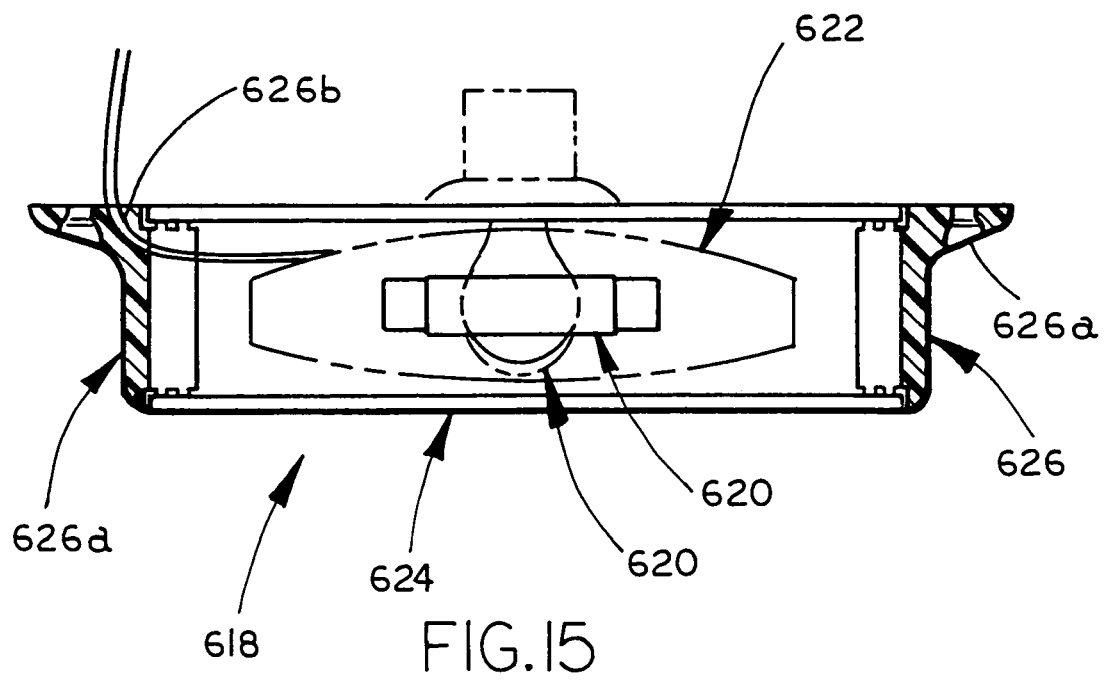
FIG. 15 is a cross-section view taken along line XV—XV of FIG. 14.

Mirror assembly 611 further includes a light assembly 618, which is exteriorly mounted to mirror casing 612 and, in the illustrated embodiment, is mounted to bottom wall 612a of mirror casing 612. Referring to FIGS. 14 and 15, light assembly 618 comprises a unitary module, which can be post-attached to the exterior rearview mirror assembly by, for example, fasteners 620 or by fastenerless attachment or mounting means. As best seen in FIG. 15, light assembly 618 includes one or more light sources 620, a reflector 622, and a cover 624. Light source or light sources 620 may comprise an incandescent light source, such as a bulb or festoon lamp, and may comprise a non-incandescent light source, such as a light emitting diode (LED), including the light module described in co-pending U.S. provisional application entitled VEHICULAR NON-INCANDESCENT LIGHT MODULE, Ser. No. 60/271,466, filed Feb. 26, 2001, which is incorporated by reference in its entirety. Suitable light sources include, as noted above, an incandescent light source, a fluorescent light source (such as a cold cathode fluorescent light source), a phosphorous light source, a neon light source, a discharge light source, an arc light source, an electroluminescent light source (including inorganic or organic electroluminescent sources), a laser diode light source, a solid state emitter light source (such as a light emitting diode), or the like. The light emitted by light sources 620 may include white, orange, yellow, amber, reddish-orange, or the like.

Optionally, light assembly 618 may comprise a signal light assembly in which case either one or more of the light sources 620 and/or cover 624 may provide the desired color of light. In addition, a filter may be provided to achieve the desired color. In the illustrated embodiment, cover 624 comprises a lens and, further, an extruded lens which has an arcuate cross-section. Optionally, lens 624 may be extruded with one portion 624a having a light blocking color, such as a black, while the rearward facing portion 624b may be formed from a clear or colored plastic, such as an amber or reddish amber or the like. In addition, lens 624 may incorporate optical features, such as optical surfaces, to direct light form light sources 620 in a desired light patter. Alternately, cover 624 may comprise a clear plastic cover and may include optional optical features, such as optical surfaces, to direct the light from light source(s) 620 in a desired light pattern, such as a downwardly and rearwardly pattern in order to provide a security light.

Mounted to opposed ends of cover 624 are end caps 626, which include mounting flanges 626a for mounting light assembly 618 to bottom wall 612a of mirror casing 612. In addition, one of the end caps (626) may include a transverse passage 626b through which wiring 628 of light source 620 extends for coupling to a power supply. For example, wiring 628 may extend through casing 612 and through mounting portion 614 for coupling to a vehicle area network or a vehicle ignition system or may be coupled to a control module located in exterior rearview mirror assembly 612, such as described in U.S. Pat. No. 6,019,475, which is incorporated by reference herein in its entirety. End caps 626 are preferably plastic end caps and, further, are formed from a light blocking material so that the light from light source(s) 620 does not enter laterally into the vehicle.

Light assembly 618 assembly also includes a mounting plate 630. Cover 624 is mounted to mounting plate 630 either by mechanical attachment or adhesive attachment, such as by an adhesive or the like, and encloses light source(s) 620 therein, which are mounted to mounting flange 640. Together with cover 624 and end caps 626, mounting plate 630 forms the unitary module. In this manner, light assembly 618 can be quickly and easily attached to a mirror assembly during the assembly process or post-attached, for example, at a dealership.

Figure 16:
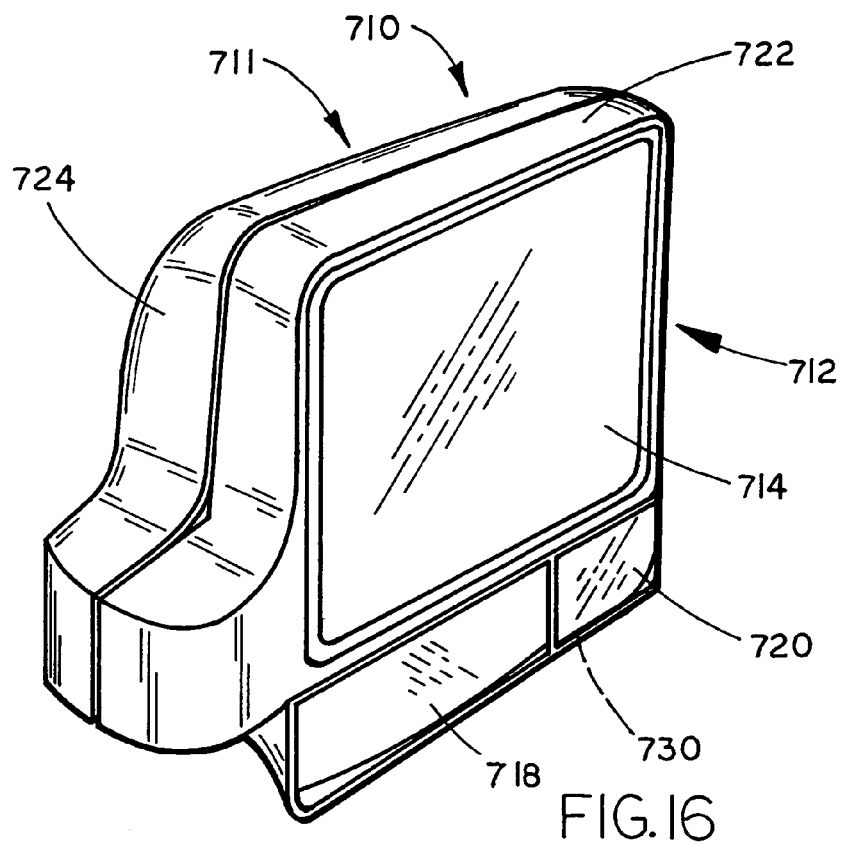
FIG. 16 is a perspective view of yet another embodiment of a mirror system of the present invention.

Referring to FIG. 16, the numeral 710 designates yet another embodiment of the mirror system of the present invention. Mirror system 710 includes a mirror casing 711 and an optional control, similar to the controls described in reference to the previous embodiments. Rearview mirror assembly 711 includes a mirror casing 712 and a reflective element assembly 714, which is supported in mirror casing 712 by an actuator 716 (FIG. 17) which provides for adjustment for reflective element assembly 714 about one or more axes. For details of suitable actuators, reference is made to the previous embodiments. Mirror casing 712 further includes an auxiliary or spotter mirror reflective element 718 preferably a wide angle reflective element, such as a curved reflective element including a convex reflective element or a multi-radius or aspheric reflective element. For example, reflective element 718 may comprise a reflective element such as described in application entitled EXTERIOR MIRROR PLANO-AUXILIARY REFLECTIVE ELEMENT ASSEMBLY, filed Jan. 6, 2000, Ser. No. 09/478,315, now U.S. Pat. No. 6,522,451, the disclosure of which is incorporated by reference herein in its entirety. Optionally, mirror casing 712 also includes a light assembly 720, which may form a turn signal light. For examples of suitable light assemblies, reference is made herein to U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and U.S. patent application Ser. No. 09/596,015, now U.S. Pat. No. 6,296,379; Ser. No. 09/641,371, now U.S. Pat. No. 6,299,333; Ser. No. 09/335,010, now U.S. Pat. No. 6,276,821; and Ser. No. 09/630,332, now U.S. Pat. No. 6,280,069, all of which are incorporated by reference in their entireties herein. For suitable light sources for light assembly 720 reference is made to the previous embodiments.

Figure 17:
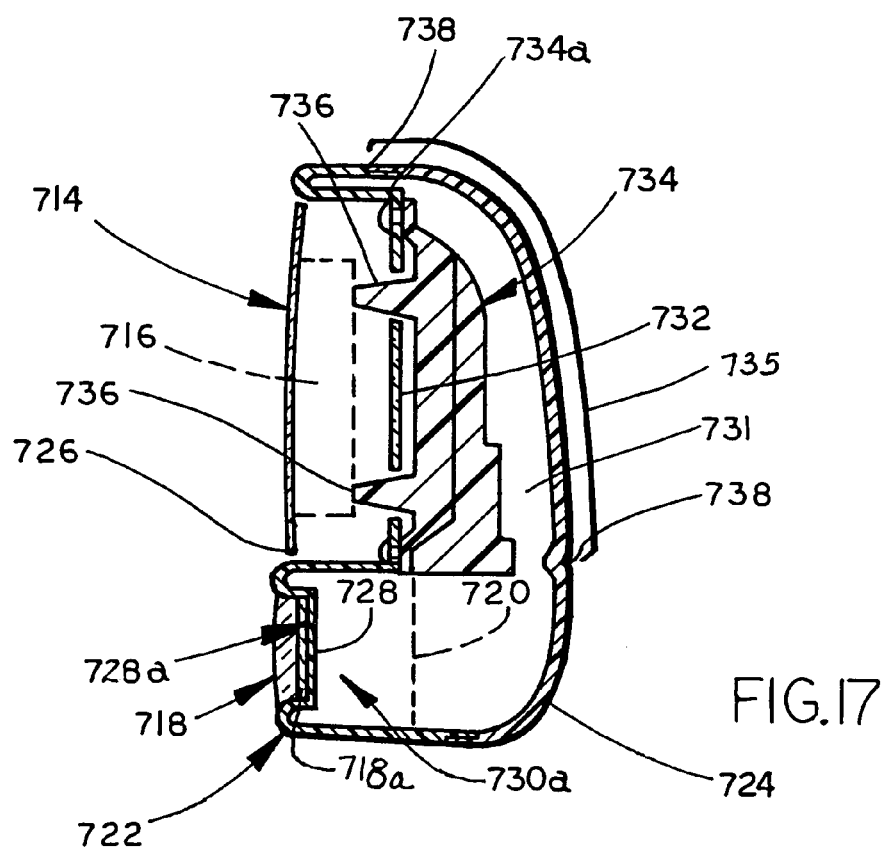
FIG. 17 is a cross-section taken along line XVII—XVII of FIG. 16.

Referring to FIGS. 16 and 17, reflective element 718 and light assembly 720 are positioned below reflective element assembly 714. As best seen in FIG. 17, mirror casing 712 includes a rearward facing portion or bezel 722 (which faces toward the trunk or rear of the vehicle when mounted on a vehicle) and a forward facing portion or back-can 724 (which faces in the direction the vehicle is moving when normally traveling on a highway). Rearward facing portion 722 includes an upper rearward facing recess or recessed portion 726 in which reflective element assembly 714 is supported by actuator 716 and a lower rearward facing recessed portion 728, which is below recess 726 and which provides a mounting surface or wall 728a for auxiliary reflective element 718. Reflective element 718 is attached to wall 728a adhesively, for example, by an adhesive tape 718a, which is commonly used in the art, or is mechanically secured such as by snaps, fasteners, or the like. Adjacent recessed portion 728 is a rearward facing opening 730 (FIG. 16) and a rearward facing cavity 730a in which light assembly 720 is positioned. Light assembly 720 and reflective element 718 are generally horizontally aligned below reflective element assembly 714 in bezel 722 and, further, such that light assembly 720 is in an outboard position relative to reflective element 718, when rearview mirror assembly 711 is mounted to the vehicle.

Referring again to FIG. 17, forward facing portion 724 is attached to rearward facing portion 722 and is secured thereto mechanically, such as by snaps, fasteners, or the like, or adhesively, such as by using a glue or adhesive tape, to form an enclosure 731. Actuator 716 is supported by a bracket 734, which is positioned in casing 712 behind rear wall 732 of recess 726 in enclosure 731 and attached to back wall 732 mechanically, such as by fasteners 734a, or by heat staking or the like. Bracket 734 includes projecting mounting bosses 736 that extend through rear wall 732 for mounting actuator 716 thereon by such fasteners.

As is commonly known in the art, forward facing portion 724 may be painted or coated with a decorative finish, such as described in U.S. Pat. application entitled COATED EXTERIOR MIRROR HOUSING FOR VEHICLES, Ser. No. 09/348,083, filed Jul. 6, 1999, now U.S. Pat. No. 6,150,014, which is incorporated by reference in its entirety. As will be more fully described below, alternately, forward facing portion 724 may be coated with a decorative film such as described in co-pending U.S. Pat. application entitled COATED POLYOLEFIN EXTERIOR VEHICLE PARTS AND METHOD FOR MAKING SAME, Ser. No. 09/489,322, filed Jan. 21, 2000, which is incorporated by reference in its entirety. In the illustrated embodiment, forward facing portion 724 includes a film 735 (preferably an in-mold film such as described and as applied as disclosed in the above referenced patent application entitled COATED POLYOLEFIN EXTERIOR VEHICLE PARTS AND METHOD FOR MAKING SAME, which only partially covers forward facing portion 724 to provide a two-tone effect. As a result, the lower portion of forward facing portion 724 is left undecorated (and may be black depending the material used to form the rearward facing portion) or may be provided with a grained or textured appearance. As noted previously, the decorated portion may include a decorative finish such as a color finish, including a color finish that matches the body paint of the vehicle, a wood grain finish, accent finishes, such as neon colors, designer colors, color patterns, carbon fiber finishes, brushed aluminum finishes, or the like. Optionally, the lower portion of forward facing portion 724 may be provided with molded-in components, such as the reflectors described in reference to the previous embodiment. Thus, film 735 provides a decorative color or finish to the upper portion of forward facing portion 724, which provides a similar decorative appearance as a fully covered skull cap but at a reduced cost since the present invention eliminates the need for a skull-cap.

In order to conceal the edges of film 735, forward facing portion 724 is molded with a nesting site 738 at the lower perimeter of the upper portion of forward facing portion 724 and, further, at the upper portion of forward facing portion 724, for example at the juncture between bezel 722 and forward facing portion 724. In this manner, the perimeter portion of film 735 may be tucked inwardly during the film application process. In this manner, mirror casing 712 is provided with a smooth transition between the film surface and the remaining surface of mirror casing 712. Optionally, mirror casing 712 may incorporate a trim element, such as an overlay, including a gasket material overlay, or a gap hider which inserts into nesting portion 734 over the perimeter edges of film 735 to provide a decorative or cosmetic finish to mirror casing 712.

While several forms of the invention have been shown and described, other forms will now be apparent to those skilled in the art. For example, the mirror assemblies may comprise extendable mirror assemblies. In addition, many of the mirror assemblies may incorporate skull caps or other styling features to make the mirror assemblies more aesthetically pleasing to consumers. Furthermore, the exterior rearview mirror assemblies may incorporate a wide variety of additional features, such as antennas, including global positioning system (GPS) or cellular phone antennas, such as disclosed in U.S. Pat. No. 5,971,552, a communication module, such as disclosed in U.S. Pat. No. 5,798,688, blind spot detection systems, such as disclosed in U.S. Pat. Nos. 5,929,786 or 5,786,772, transmitters and/or receivers, such as garage door openers, including a HOMELINK® system, a digital network, such as described in U.S. Pat. No. 5,798,575, a high/low head lamp controller, such as disclosed in U.S. Pat. No. 5,715,093, a tire pressure display or monitoring system, such as disclosed in U.S. Pat. application entitled TIRE INFLATION ASSISTANCE MONITORING SYSTEM, Ser. No. 09/513,941, filed Feb. 28, 2000, now U.S. Pat. No. 6,294,989, and TIRE INFLATION ASSISTANCE MONITORING SYSTEM, filed Nov. 10, 2000, now U.S. Pat. No. 6,445,287, with all of the referenced patents and applications commonly assigned to Donnelly Corporation, the disclosures of which are herein incorporated by reference in their entireties.

In addition, the fixed portion of the system may be incorporated into or form a part of a modular door, such as disclosed in U.S. provisional applications entitled EXTERIOR MIRROR ASSEMBLY FOR VEHICULAR MODULAR DOOR, Ser. No. 60/159,661, filed Oct. 15, 1999; and MODULAR DOOR ASSEMBLY, Ser. No. 09/679,997, filed Oct. 15, 2000, now U.S. Pat. No. 6,669,267, which are incorporated herein by reference in their entireties.

Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A mirror system for a vehicle, said mirror system comprising:
   an exterior rearview minor assembly comprising:
      a reflective element;
      a fixed portion being configured to mount to a side of the vehicle;
      a movable portion being movably mounted to said fixed portion, said reflective element being supported in said mirror assembly by a reflective element actuator, said reflective element having a generally rearward field of view when said mirror system is mounted to the vehicle, said reflective element actuator providing selective adjustment of an orientation of said reflective element to adjust said rearward field of view to a desired orientation for a driver of the vehicle;
      a movable portion actuator for selectively moving said movable portion between a viewing position wherein said movable portion is extended outwardly from the vehicle at an angle with respect to the side of the vehicle and another viewing position wherein said movable portion is extended outwardly from the vehicle at another angle with respect to the side of the vehicle;
      a control selectively actuating said movable portion actuator to reposition said movable portion about said fixed portion to one of said positions; and
      said control further actuating said reflective element actuator to adjust the orientation of said reflective element responsive to said repositioning of said movable portion and to compensate for the repositioning of said movable portion so as to maintain said desired orientation independent of the position of said movable portion.

2. The mirror system according to claim 1, wherein said exterior rearview mirror system further includes a reflective element support, said reflective element actuator being supported by said reflective element support in said movable portion.

3. The mirror system of claim 1, said exterior rearview mirror assembly further comprising a power-fold mechanism, said control in communication with said power-fold mechanism and actuating said power-fold mechanism to move said movable portion between said viewing positions.

4. The mirror system of claim 3, wherein said reflective element actuator is supported by said movable portion.

5. The mirror system of claim 4, wherein said control selectively actuates said movable portion actuator in response to the vehicle traveling at a pre-selected speed.

6. The mirror system according to claim 1, wherein said control selectively actuates said movable portion actuator in response to the vehicle traveling at pre-selected speeds.

7. The mirror system according to claim 1, wherein said exterior rearview mirror assembly further comprises a light emitting element.

8. The mirror system of claim 7, wherein said light emitting element is provided in said movable portion.

9. The mirror system of claim 8, wherein said light emitting element is provided at an outboard position whereby said light emitting element generates a sweeping light pattern extending outwardly and at least generally laterally with respect to the vehicle when said light emitting element is actuated and when said movable portion actuator is actuated, and said control including a user actuatable device accessible by an occupant of the vehicle wherein the occupant may power said light emitting element white actuating said movable portion actuator to illuminate an area adjacent the vehicle.

10. The mirror system of claim 9, wherein said movable portion actuator comprises a power-fold mechanism.

11. The mirror system of claim 9, wherein said control is configured to actuate said movable portion actuator to move said movable portion to reduce wind noise.

12. The mirror system of claim 11, wherein said movable portion comprises a mirror casing.

13. The mirror system of claim 11, further comprising a control system, said control system including said control and a lock-out circuit wherein said light emitting element cannot be powered when the vehicle is being driven.

14. The mirror system of claim 7, wherein said light emitting element comprises a signal light assembly.

* * * * *

UNITED STATES PATENT AND TRADEMARK OFFICE
CERTIFICATE OF CORRECTION

PATENT NO. : 7,216,994 B2 Page 1 of 1
APPLICATION NO. : 11/115700
DATED : May 15, 2007
INVENTOR(S) : Leo W. Pavao It is certified that error appears in the above-identified patent and that said Letters Patent is hereby corrected as shown below:

<u>Column 15:</u>
Line 54, "paent" should be --patent--.

<u>Column 19:</u>
Line 45, Claim 1, "minor" should be --mirror--.

<u>Column 20:</u>
Line 45, Claim 9, "white" should be --while--.

Signed and Sealed this

Twentieth Day of May, 2008

JON W. DUDAS
*Director of the United States Patent and Trademark Office*